United States Patent
Liao et al.

(10) Patent No.: US 12,369,076 B2
(45) Date of Patent: Jul. 22, 2025

(54) MOBILE-TERMINATED PACKET TRANSMISSION

(71) Applicant: Apple Inc., Cupertino, CA (US)

(72) Inventors: Ching-Yu Liao, Hillsboro, OR (US); Mohammad Mamunur Rashid, Hillsboro, OR (US); S. M. Iftekharul Alam, Hillsboro, OR (US); Rath Vannithamby, Portland, OR (US)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 17/889,728

(22) Filed: Aug. 17, 2022

(65) Prior Publication Data

US 2022/0394551 A1 Dec. 8, 2022

Related U.S. Application Data

(62) Division of application No. 15/775,094, filed as application No. PCT/US2016/063999 on Nov. 29, 2016, now Pat. No. 11,825,352.
(Continued)

(51) Int. Cl.
*H04W 28/088* (2023.01)
*H04L 67/563* (2022.01)
(Continued)

(52) U.S. Cl.
CPC ......... *H04W 28/088* (2023.05); *H04W 40/24* (2013.01); *H04W 76/10* (2018.02); *H04L 67/563* (2022.05)

(58) Field of Classification Search
CPC ... H04W 28/088; H04W 76/10; H04W 40/24; H04L 67/563
See application file for complete search history.

(56) References Cited

U.S. PATENT DOCUMENTS 8,195,989 B1 6/2012 Lu et al.
8,972,519 B2 * 3/2015 Attanasio ............ H04L 65/1063
717/168
(Continued)

FOREIGN PATENT DOCUMENTS

WO 2015002404 A1 1/2015

OTHER PUBLICATIONS

"International Application Serial No. PCT/US2016/063999, International Search Report mailed Mar. 8, 2017", 3 pgs.
(Continued)

*Primary Examiner* — Faruk Hamza
*Assistant Examiner* — Tito Q Pham
(74) *Attorney, Agent, or Firm* — Kowert, Hood, Munyon, Rankin & Goetzel, P.C.

(57) ABSTRACT

Methods, apparatus circuitry, and storage media are described for mobile-terminated packet transmissions. In one embodiment, an apparatus of a control plane device configured to operate within an evolved packet network core identifies a first service flow event trigger associated with a first packet data unit (PDU) session and processes a path reselection for a first PDU session in response to the first service flow event trigger, wherein the path reselection determines a new gateway for the first PDU session resulting from the path reselection. Transmission of a change notification to an application server controller associated with the first PDU session is initiated in response to the path reselection. Transmission of a routing update to the new gateway in response to the path reselection is also initiated. In various embodiments, the trigger may be a mobility event, a load balancing event, or operations in association with an application server controller.

15 Claims, 10 Drawing Sheets

Related U.S. Application Data

(60) Provisional application No. 62/261,142, filed on Nov. 30, 2015.

(51) Int. Cl.
*H04W 40/24* (2009.01)
*H04W 76/10* (2018.01)

(56) References Cited

U.S. PATENT DOCUMENTS

| | | | |
|---|---|---|---|
| 10,447,576 B2 | 10/2019 | Zhang et al. | |
| 2006/0075126 A1* | 4/2006 | Lehrschall | H04L 65/104 709/229 |
| 2010/0062774 A1 | 3/2010 | Motegi et al. | |
| 2011/0280143 A1 | 11/2011 | Li | |
| 2012/0269182 A1* | 10/2012 | Walker | H04W 8/04 370/338 |
| 2013/0122879 A1 | 5/2013 | Mathieu et al. | |
| 2014/0036776 A1 | 2/2014 | Al-Shalash | |
| 2014/0078923 A1* | 3/2014 | Guan | H04W 24/10 370/252 |
| 2014/0119358 A1 | 5/2014 | Xu | |
| 2014/0254373 A1 | 9/2014 | Varma | |
| 2014/0259012 A1* | 9/2014 | Nandlall | G06F 9/45558 718/1 |
| 2015/0208306 A1 | 7/2015 | Kotecha | |
| 2015/0365322 A1 | 12/2015 | Shatzkamer et al. | |
| 2016/0007138 A1* | 1/2016 | Palanisamy | H04L 12/28 455/41.2 |
| 2016/0112897 A1* | 4/2016 | Kunz | H04W 24/10 370/230 |
| 2016/0142954 A1* | 5/2016 | Cho | H04W 36/0066 370/331 |
| 2016/0278147 A1* | 9/2016 | Adrangi | H04L 9/3263 |
| 2016/0301762 A1 | 10/2016 | Strijkers et al. | |
| 2016/0330647 A1* | 11/2016 | Iwai | H04W 28/0268 |
| 2016/0374095 A1 | 12/2016 | Jeon | |
| 2016/0381662 A1* | 12/2016 | Wang | H04W 12/00 370/329 |
| 2017/0026273 A1 | 1/2017 | Yao et al. | |
| 2017/0126618 A1 | 5/2017 | Bhaskaran et al. | |
| 2017/0257726 A1 | 9/2017 | Jeong et al. | |
| 2017/0295103 A1* | 10/2017 | Starsinic | H04W 28/12 |

OTHER PUBLICATIONS

"International Application Serial No. PCT/US2016/063999, Written Opinion mailed Mar. 8, 2017", 12 pgs.

Notice of Allowance, U.S. Appl. No. 15/775,094, date mailed Jul. 25, 2023, 10 pgs.

* cited by examiner

700

705 — CONFIGURING A ROUTING POLICY FOR ONE OR MORE DATA GATEWAYS (DGWS), WHEREIN THE ROUTING POLICY IS TO INDICATE A SECOND DGW TO TAKE OVER SERVICE, FROM A FIRST DGW, OF A SERVICE FLOW OF A USER EQUIPMENT (UE), WHEREIN THE FIRST DGW AND THE SECOND DGW ARE AMONG THE ONE OR MORE DGWS

710 — INITIATING A NOTIFICATION PROCEDURE INCLUDING SENDING A REQUEST TO PERFORM THE NOTIFICATION PROCEDURE TO A SERVICES CAPABILITY SERVER (SCS) VIA A SERVICES INTERWORKING FUNCTION (SERVICES-IWF)

715 — TRANSMITTING A NETWORK CONFIGURATION INFORMATION NOTIFICATION (NCIN) MESSAGE TO THE SCS, WHEREIN THE NCIN MESSAGE INCLUDES A SERVICE IDENTIFIER (ID), FLOW ID, AND TEMP MOBILE DEVICE ID TO BE USED TO IDENTIFY A MOBILE TERMINATION (MT) FOR THE SERVICE FLOW OF THE UE

*FIG. 7*

MOBILE-TERMINATED PACKET TRANSMISSION

PRIORITY CLAIM

This application is a divisional of U.S. patent application Ser. No. 15/775,094, filed May 10, 2018, and titled "MOBILE-TERMINATED PACKET TRANSMISSION", which is a U.S. National Stage Filing under 35 U.S.C. 371 from International Application No. PCT/US2016/063999, filed Nov. 29, 2016 and published in English as WO 2017/095809 on Jun. 8, 2017, which claims the benefit of priority to U.S. Provisional Patent Application Ser. No. 62/261,142, filed Nov. 30, 2015, and entitled "HANDLING MOBILE-TERMINATED PACKET TRANSMISSION IN A SDN-BASED MOBILE NETWORK," all of which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to wireless communications. Some embodiments relate to providing data in cellular and wireless local area network (WLAN) networks, including Third Generation Partnership Project (3GPP) Long Term Evolution (LTE) networks and LTE advanced (LTE-A) networks as well as fourth-generation (4G) networks and fifth-generation (5G) networks, all of which are hereinafter referred to as LTE networks. Some embodiments relate to general wireless communications and the handling of mobile-terminated packet transmissions in a software-defined network (SDN)-based mobile network.

BACKGROUND

The use of 3GPP LTE systems (including LTE and LTE-Advanced systems) has increased due to an increase in both the types of user equipment (UEs) using network resources and the amount of data and bandwidth being used by various applications, such as video streaming, operating on these UEs. As a result, 3GPP LIE systems continue to develop, with the next-generation wireless communication system, 5G, aiming to answer the ever-increasing demand for bandwidth and flexibility in responding to user requirements.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 7 illustrates one example method of mobile-terminated packet transmissions in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
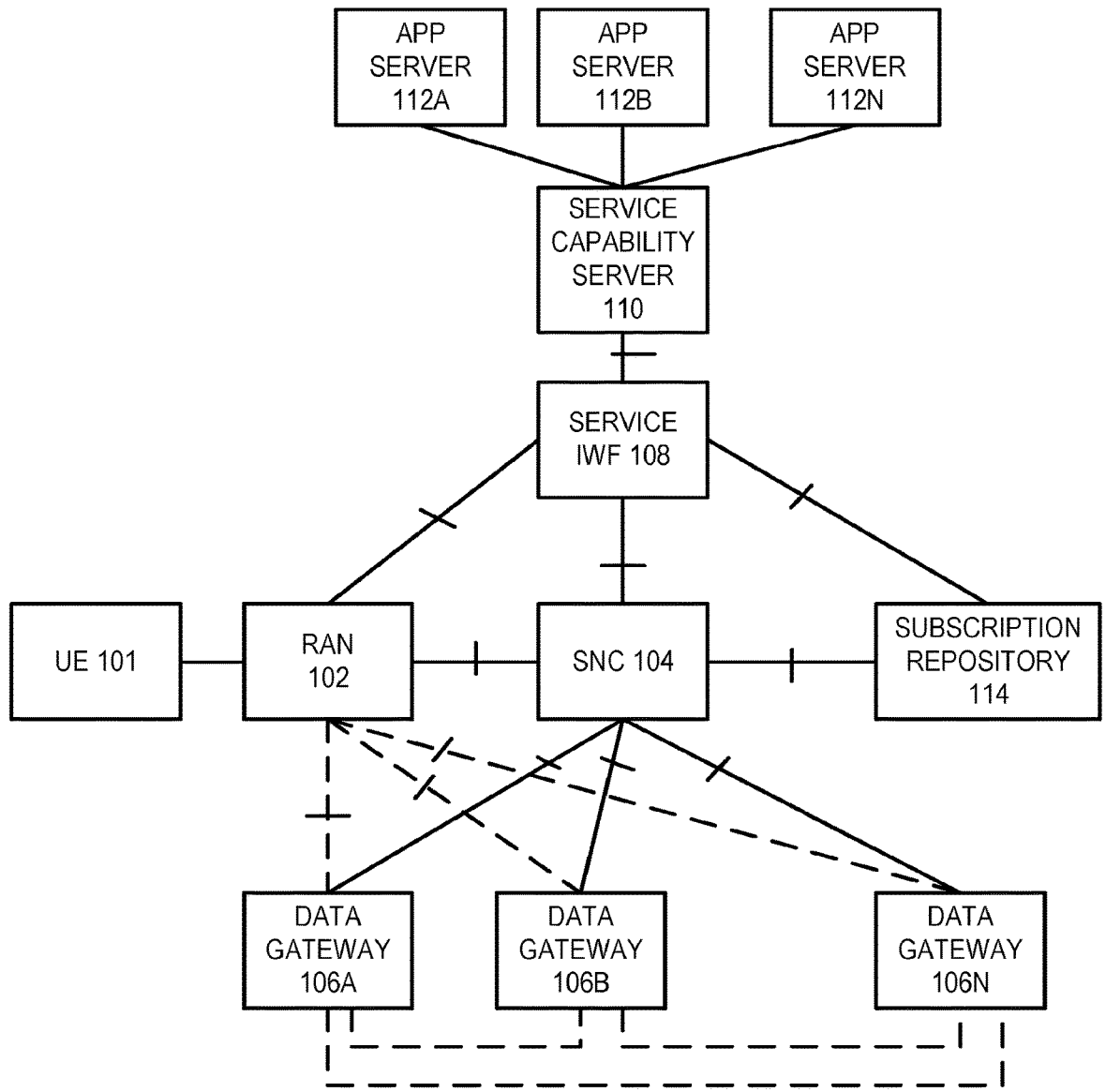
FIG. 1 is a diagram of a wireless network in accordance with some embodiments.

FIG. 1 shows aspects of an example software-defined network (SDN)-based mobile network architecture system 100 in accordance with some embodiments. SDN-based mobile network architecture system 100 includes the following illustrated network entities: user equipment (UE) 101; radio access network (RAN) 102; software-defined network controller (SNC) 104; data gateways (DGWs) 106A-N; services interworking function (IWF) system 108; service capability server (SCS) 110; and access servers 112A-N. Other network embodiments may include additional entities and elements, or other combinations of entities and elements while still operating in accordance with the embodiments described herein.

SDN-based mobile network architecture system 100 is implemented, in some embodiments, as a long-term evolution (LTE) network. As used herein, "LTE network" refers to both LTE and LTE Advanced (LTE-A) networks as well as other versions of LTE networks in development, such as 4G and 5G LTE networks. The network may comprise a radio access network (RAN) 102 and a core network (e.g., evolved packet core or NextGen core) coupled together through an interface.

The RAN 102 may include evolved node Bs (eNBs) (which may operate as base stations) for communicating with user equipment (UE) 101. The eNBs may include macro eNBs and low power (LP) eNBs.

The eNBs of RAN 102 (macro and micro) may terminate the air interface protocol and may be the first point of contact for a UE 101. In some embodiments, an eNB may fulfill various logical functions for the RAN 102 including, but not limited to, RNC (radio network controller) functions such as radio bearer management, uplink and downlink dynamic radio resource management and data packet scheduling, and mobility management. In accordance with embodiments, the UEs 101 may be configured to communicate orthogonal frequency division multiplexed (OFDM) communication signals with an eNB over a multicarrier communication channel in accordance with an orthogonal frequency-division multiple access (OFDMA) communication technique. The OFDM signals may comprise a plurality of orthogonal subcarriers.

With cellular networks, LP eNBs of RAN 102 may be used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term "LP eNB" refers to any suitable relatively LP eNB for implementing a smaller cell (smaller than a macro cell) such as a femtocell, a picocell, or a microcell. Femtocell eNBs may typically be provided by a mobile network operator to its residential or enterprise customers. A femtocell may be the size of a residential gateway or smaller and generally connects to a broadband line. The femtocell may connect to the mobile operator's mobile network and provide extra coverage in a range of typically 30 to 50 meters. Thus, a LP eNB might be a femtocell eNB. Similarly, a picocell may be a wireless communication system typically covering a small area, such as in-building (offices, shopping malls, train stations, etc.), or in-aircraft. A picocell eNB may generally connect through an X2 link to another eNB such as a macro eNB through its base station controller (BSC) functionality.

Communication over an LTE network may be split up into 10ms radio frames, each of which may contain ten 1 ms subframes. Each subframe of the frame, in turn, may contain two slots of 0.5 ms. Each subframe may be used for uplink (UL) communications from the UE 101 to the eNB of RAN 102 or downlink (DL) communications from the RAN 102 to the UE 101. In one embodiment, the eNB may allocate a greater number of DL communications than UL communications in a particular frame. The eNB may schedule transmissions over a variety of frequency bands. Each slot of the subframe may contain 6-7 OFDM symbols, depending on the system used. In one embodiment, each subframe may contain 12 subcarriers. In the 5G system, however, the frame size (ms), the subframe size, and the number of subframes within a frame, as well as the frame structure, may be different from those of a 4G or LTE system. The subframe size, as well as the number of subframes in a frame, may also vary in the 5G system from frame to frame. For example, while the frame size may remain at 10 ms in the 5G system for downward compatibility, the subframe size may be decreased to 0.2 ms or 0.25 ms to increase the number of subframes in each frame. Some embodiments may also operate with narrowband systems in a 180 kilohertz (kHz) band for machine-type or cellular internet of things communications.

System 100 includes a UE 101 and an a RAN 102 including one or more eNBs connected via one or more channels to UEs including UE 101 across an air interface. The UE 101 and eNB of the RAN 102 communicate using a system that supports controls for managing the access of the UE 101 to a network via the eNB.

SDN-based mobile network architecture system 100, the UE 101, and any other UEs in the system 100 may be, for example, laptop computers, smartphones, tablet computers, printers, machine-type devices such as smart meters or specialized devices for healthcare monitoring, remote security surveillance systems, intelligent transportation systems, or any other wireless devices with or without a user interface. The RAN 102 provides the UE 101 network connectivity to a broader network that includes application servers 112A-N. This UE 101 connectivity is provided via the air interface to an eNB of RAN 102 in a service area provided by the eNB. In some embodiments, such a broader network including the application servers 112 may be a wide area network operated by a cellular network provider, or may be the Internet. Each eNB service area associated with the RAN 102 is supported by antennas. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of an eNB, for example, includes three sectors each covering an approximately 120-degree area with an array of antennas directed to each sector to provide 360-degree coverage around the eNB.

The UE 101 includes control circuitry coupled with transmit circuitry and receive circuitry. The transmit circuitry and receive circuitry may each be coupled with one or more antennas. The control circuitry may be adapted to perform operations associated with wireless communications using congestion control. The control circuitry may include various combinations of application-specific circuitry and baseband circuitry. The transmit circuitry and receive circuitry may be adapted to transmit and receive data, respectively, and may include radio frequency (RF) circuitry or front end module (FEM) circuitry. In various embodiments, aspects of the transmit circuitry, receive circuitry, and control circuitry may be integrated in various ways to implement the circuitry described herein. The control circuitry may be adapted or configured to perform various operations such as those described elsewhere in this disclosure related to a UE, including initiating communications transmitted or received by an associated antenna, processing information, or encoding/decoding data. The transmit circuitry may transmit a plurality of multiplexed uplink physical channels. The plurality of uplink physical channels may be multiplexed according to time division multiplexing (TDM) or frequency division multiplexing (FDM) along with carrier aggregation. The transmit circuitry may be configured to receive block data from the control circuitry for transmission across the air interface. Similarly, the receive circuitry may receive a plurality of multiplexed downlink physical channels from the air interface and relay the physical channels to the control circuitry. The plurality of downlink physical channels may be multiplexed according to TDM or FDM along with carrier aggregation. The transmit circuitry and the receive circuitry may transmit and receive both control data and content data (e.g., messages, images, video, etc.) structured within data blocks that are carried by the physical channels. For a machine configured for low bandwidth or irregular communications (e.g., utility meters, stationary sensors, etc.) customized circuitry and antennas may be used to enable communications on a narrow bandwidth (e.g., 180 kHz, or other similar narrow bandwidths) to enable the device to consume small amounts of network resources. In various embodiments, an eNB of RAN 102 may be structured with transmit, receive, and control circuitry similar to the description of circuitry for a UE above.

In previous Evolved Packet Systems (EPS), a user equipment
(UE) may establish a Public Data Network (PDN) connection with a PDN gateway (P-GW) which may be associated with an Access Point Name (APN) for a service provided by the PDN. For a mobile-terminated packet transmission in the EPS, an Application Server in the PDN can transmit packets towards a UE by the PDN connection via a P-GW in the EPS, in which the P-GW is static as a termination of the PDN connection. However, the user plane General Packet Radio Service (GPRS) Tunneling Protocol (GTP)-tunneling mechanism used in Evolved Packet Core (EPC) network lacks flexibility for adapting to the real-time network load status.

Embodiments described herein provide improvements to resolve this issue in a software-defined network (SDN)-based architecture such as the illustrative system 100 of FIG. 1 in part by separating the control plane signaling interface and the user plane data interface. As such, a SDN-based network controller (SNC) 104 can configure one or more data gateways (DGW) 106A-N with the routing polices that reflect a real-time or near real-time network load status. With such a flexible design in a SDN-based architecture, an SNC 104 may determine to change a boundary DGW (e.g., any of Data Gateways 106A-N operating as a boundary DGW serving a particular UE such as UE 101 via RAN 102) within a SDN-based mobile network (SMN) for a flow of the service based on the optimal configuration of the network (e.g., for load balancing), wherein the boundary DGW in the SMN is interfacing with one or more packet data networks outside of the SMN (e.g., networks including any one or more of application servers 112A-N). Following the principle of the separation of the control plane and user plane functions, the SNC is with the control plane functions of handling the IP address allocation and preservation. The mobile device is thus transparent to the change of the network configuration (e.g. able to continue operating during the change in configuration). In some embodiments, the SNC allocates IP addresses of the requested services in the service domains within an SMN, and preserves the allocated IP addresses of the requested services for the mobile device.

In an SMN, SNC 104, the control-plane network entity, is responsible for handling connection and session management for the mobile devices based on the requested services. When provisioning a requested service for a mobile device, an SNC determines one or more service flows, and configures one or more data gateways (D-GW) with the routing polices to reflect to the real-time network load status. The data gateway at the edge of the operator's mobile network is deemed as a boundary D-GW and it interfaces with one or more packet data networks outside of the SMN. Following the principle of the separation of the control plane and user plane functions, in some embodiments the SNC is with the functions of the internet protocol (IP) address allocation and preservation to ensure that the registered mobile device is transparent to the change of the network configuration, e.g. one or more DGWs involving the routing of the service flow, during the life time of the service. The centralized architecture has various merits: DGWs are simplified with a routing function for receiving and forwarding traffic flows in the user plane; without the IP tunnel established towards the boundary DGW, the signaling overheads can be greatly reduced for the exchanges of the IP address information; it provides more flexible way of the network deployment for providing required network capability by adding or removing data plane entities; and as such, network management complexities can be greatly reduced.

There are also a number of scenarios that may result in the decision to change a boundary DGW by a SNC, such as:
The boundary DGW fails due to unknown reasons;
The boundary DGW becomes overloaded or congested; and/or
In view of quality of service (QoS) provisioning, when a UE is moving towards a proximity area close to a boundary DGW other than an original one, and the requested service requires stringent latency (e.g., a mission-critical service).

For a flow of a service, when a first boundary DGW (e.g., DGW 106A) is changed by SNC 104 to a new DGW (e.g., DGW 106B), the application server (e.g., application server 112A) in the SMN may still perform mobile-terminated packet transmission towards the boundary DGW which served the flow. As described in more detail below, in the case when the first boundary DGW is in a failure state, the application server may need to re-establish the flow to continue the service. This would induce some delay for detecting the failure of the boundary DGW as well as re-establishing a new service flow. In the case before the first boundary DGW is congested or overloaded, the SNC 104 may start performing load balancing by changing the first boundary DGW to a second boundary DGW for the service flow. The first boundary DGW may start to drop or redirect the packets of the service flow. This would induce some delay for re-establishing a new service flow due to deteriorated QoS of the service flow. Flexibility for adapting to the real-time network loads may be lacking if the SNC 104 needs to keep a same boundary DGW for the lifetime of a service flow in the SMN. Embodiments herein enable flexibility by allowing changes between DGWs 106A-N during communication service flows. Example embodiments thus provide methods, apparatuses, systems, and etcetera to support mobile-terminated packet transmission.

An SNC 104 in various embodiments may thus handle the mobile terminated packet transmission in a SDN-based mobile network (SMN), wherein the SNC 104 can configure different routing polices on one or more DGWs 106A-N for flow-based quality of service (QoS) provisioning. In some embodiments, the SNC 104 may initiate a notification procedure towards a service capability server (SCS) 110 which manages a number of application servers and interfaces with a service interworking function in the SMN. Such a notification procedure may be initiated by the SNC 104 in the following scenarios but not be limited to: when a SNC changes a boundary DGW for a service flow of the mobile-terminated packet transmission for load balancing or network reconfiguration; or when a SNC receives a packet redirected from a boundary DGW. In such embodiments, the SCS 110 may reselect a new application server for continuing the service flow according to the received information.

In some embodiments, an SNC 104 can configure the flow profile (e.g. the profile for a PDU session or sessions) with one or more traffic flows based on service subscription information for the mobile device. Then the SNC configures one or more DGW with the routing policies in reflect to the real-time network loads and configurations. In the flow based QoS provisioning framework, the DGWs accommodates the traffic flows with non-IP or IP packets. The destination of the packets to be forwarded is identified by a flow ID so the traffic flows can carry either IP packets or non-IP packets. For the traffic flows with IP packets, the SNC may allocate an IP address for the requested service if IP service is required, and there is no existing IP address allocated for the services in the same service domain within the SMN. The IP address is preserved for the life time of all the requested IP services by the SNC. For example, the SNC changes the boundary DGW which is within the same service domain and shares the same IP domains in the IP pools. As another example, the SNC needs to maintain a mapping tables for the changes of the IP domains if a boundary DGW is not within the same IP domains in the IP pools.

When receiving service request from the mobile device, the SNC configures the mobile originated traffic flows and mobile terminated traffic flows separately. The SNC determines mobile terminated and/or mobile originated traffic flows only when the mobile device has subscribed the service features. During the service establishment procedure, the SNC may provide the following information towards SCS/AS via the service-IWF: the configured IP address information of the boundary DGW; the configured traffic flows information of the service, e.g. one or more flow identities; the service ID of the requested service; and/or the IP address and/or flow ID of the requested service for the mobile device.

Service Interworking Function (Service-IWF) system 108 operates to interface with one or more RAN 102 nodes over a Z3 interface, and gather Radio Access Network (RAN) layer-related information. In some embodiments, system 108 is configured to interface with one or more SDN-based network controllers (SNCs) 104 over a Z4 interface, and system 108 allocates one or more SNCs 104 to locally manage the routing policies for transmitting user plane traffic. In some embodiments, service-IWF system 108 interfaces with a service capability server (SCS) 110 and/or one or more application servers (AS) 112A-N in the Z5 interface to provide access towards a UE 101 (e.g., a mobile device) in the SDN-based mobile network of system 100. In some embodiments, service IWF system 108 works to: authorize the service requested by a mobile device over Z3/Z4 interface and/or by SCS/AS over Z8 interface; interface with subscription repository over Z6b interface to retrieve/store the service-related information, (e.g., subscription, parameters of service profile); and may be collocated with the SNC.

SCS 110 and associated application servers (AS) 112A-N work together to provide service for UE 101 in a SDN-based mobile network architecture system 100 over interface Z8 in some embodiments. SCS 110 is configured, in various embodiments, to interface with service-IWF system 108 to get authorization for the services as well as system information in the SMN and to handle the services provided by one or more ASs 112A-N or via SCS 110.

In various embodiments, SNC 104 is responsible for managing local control plane function for QoS provisioning and routing policies, and is connected with service-IWF system 108 over a Z3 interface to communicate with a SCS 110 and associated AS(s) 112A-N. In some embodiments, SNC 104 is connected with one or more data gateways (DGWs) 106A-N over a Z5 interface, and provides routing policies to one or more DGWs 106 A-N so as to provision QoS for a requested service of a mobile device. In some systems, SNC 104 provides RAN 102 nodes (e.g., eNBs) the information from the configured flow profile as well as the routing policies indicating the entry DGW address per flow. In some embodiments, SNC 104 interfaces with subscription repository 114 over a Z6a interface to retrieve/update the service-related subscription information locally.

RAN 102 nodes operate in various embodiments to store the received configured flow profile and the corresponding routing policies per flow of the service identified by a service identifier, and to identify the received user-plane traffic sending from UE 101 based on the stored flow profile for a service. In some embodiments, RAN 102 nodes forward user-plane traffic towards one or more DGWs 106A-N over a Z2 interface based on the received flow profile and the routing policies received from the SNC 104 over a Z1 interface.

Individual DGWs (e.g., any of DGW 106A-N) interface with SNC 104 to update network load status (e.g., over a Z5 interface) and to enforce routing polices received from the SNC 104. In some embodiments, DGWs 106A-N interface with one or more RAN 102 nodes over Z2 interface to forward received user-plane traffic based on the configured routing policies.

In various embodiments of a SMN such as those that may be implemented in system 100, a service flow of a mobile-terminated (MT) packet transmission of a requested service may be established between a UE 101 in a SMN and a first application server (e.g., AS 112A) in a PDN. After the MT service flow is established, the first application server 112A transmits MT packets towards the UE 101 via a first boundary DGW (e.g., DGW 106A) in the SMN. The SNC 104 may determine to adjust network configuration by configuring one or more DGWs in various scenarios such as during performance of load balancing between DGWs 106A-N for service flows based on the real-time network load status; and/or detection of one or more DGWs 106A-N in failure.

For the service flow, when a first boundary DGW 106A is changed by SNC 104, the application server 112A in the SMN may still perform MT packet transmission towards the boundary DGW 106A which served the flow. In view of service continuity, methods and an apparatus to handle MT packet transmission are presented for when a serving boundary DGW is changed for an existing service flow due to network reconfiguration.

Figure 2:
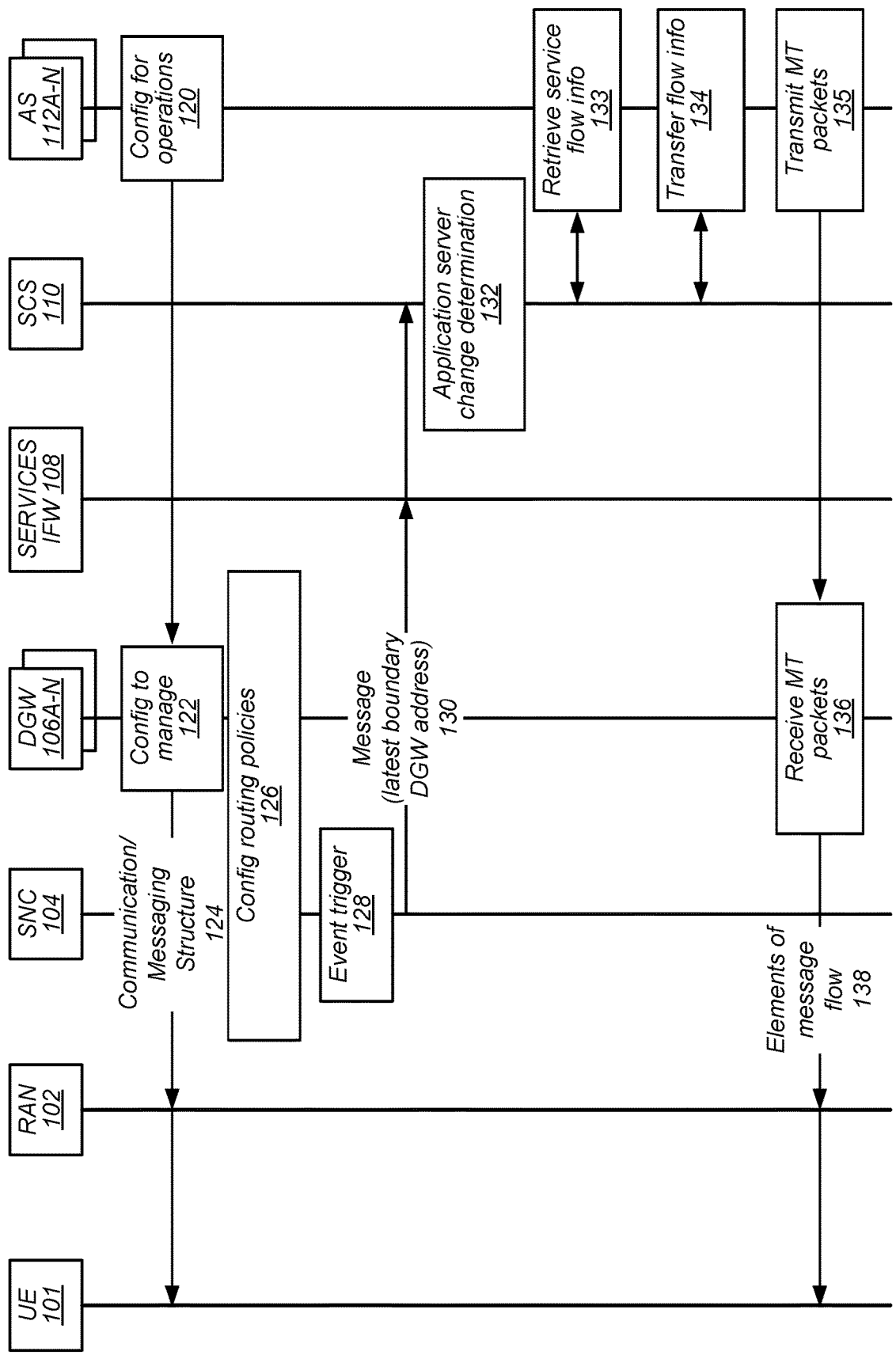
FIG. 2 illustrates aspects of mobile-terminated packet transmissions in accordance with some embodiments.

FIG. 2 illustrates aspects of mobile-terminated packet transmissions in accordance with some embodiments. FIG. 2 illustrates a method using UE 101, RAN 102, SNC 104, DGWs 106A-N, services IWF system 108, SCS 110, and AS 112A-N of FIG. 1. In other embodiments, other systems using similar elements, or different combinations of system elements, may be used.

In the embodiment illustrated by FIG. 2 a message flow is established to UE 101 from a first AS 112A via a first DGW 106A and a node (e.g., an eNB) of RAN 102. This occurs in operations 120, 122, and 124. Operation 120 involves AS 112A, configured for operations, to communicate as described above. Operation 122 involves DGW 106A configured to manage elements of a message flow from AS 112A to UE 101 via RAN 102, and operation 124 is a communication and messaging structure received at RAN 102 from DGW 106A to be sent to UE 101. Similar communications from UE 101 to AS 112A via RAN 102 and DGW 106A also occur in the opposite direction. Following this, in the embodiment of FIG. 2, the message flows when the boundary DGW of the service flow is changed by the SNC 104 from a first DGW 106A (e.g., due to load balancing or boundary DGW failure, in the middle of mobile-terminated packet transmission between the UE 101 and the first application server 112A) to a second (e.g., a new or different) DGW 106B are illustrated.

In response to the latest network load status, in operation 126 the SNC 104 configures routing polices on one or more DGWs 106A-N for the service flow of the service requested by UE 101. Then in operation 128, an event triggers the SNC 104 to perform a notification procedure towards the Service Capability Server (SCS) 110 via the service-IWF system 108. In some embodiments, the event occurs when the SNC 104 configures new routing polices on one or more DGWs 106A-N, which result in a change of a boundary DGW for an existing service flow of UE 101 (e.g., from the first boundary DGW 106A, which originally served the service flow by the application server 112A, to the second boundary DGW 106B).

The SNC 104 then encodes a message and transmits the message to provide the latest boundary DGW address (e.g., to the new DGW or second DGW 106B) to the SCS 110 in operation 130. In some embodiments, this message comprises a Network Configuration Information Notification (NCIN) message, including a service ID, flow ID, and temporary mobile device ID used to identify a MT service flow of a particular service for a mobile device (e.g., for UE 101).

Then, in some embodiments, the SCS 110 determines in operation 132 to change the serving application server from application server 112A to application server 112B according to the network configuration information about the new boundary DGW address (e.g., the Internet protocol (IP) address for the second DGW 106B), which is associated with the new boundary DGW. Additionally, the SCS 110 may retrieve service flow-related information from the AS 112A in operation 133 and transfer the flow-related information to the AS 112B in operation 134 so as to continue the service flow.

After this, the new flow operates in a fashion similar to the original flow of operations 120, 122, and 124. With the new service flow, the AS 112B starts to transmit MT packets in operation 135. The second DGW 106B receives these packets from AS 112B in operation 136 and transmits elements of the message flow to the UE 101 via the second RAN 102 in operation 138.

Figure 3:
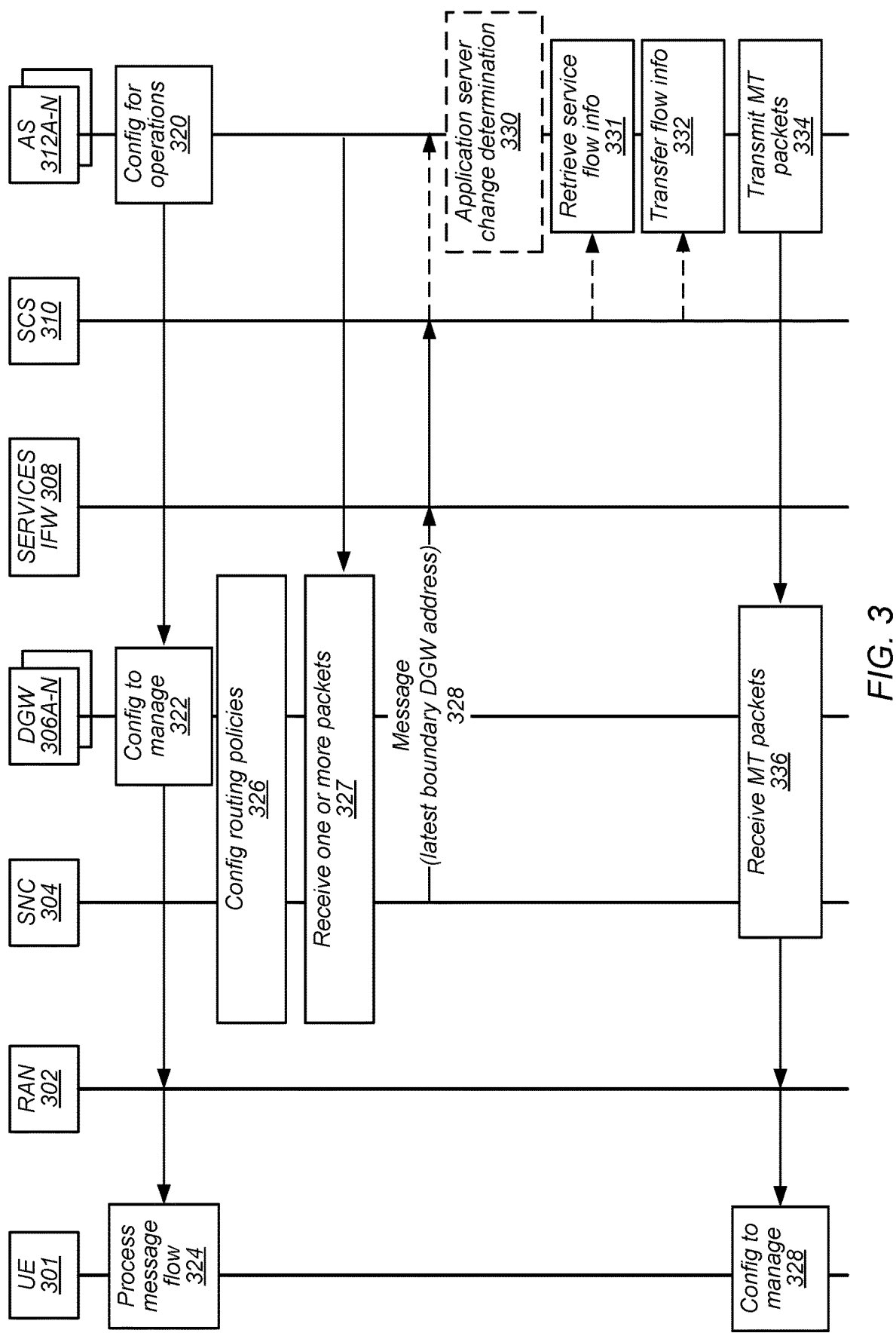
FIG. 3 illustrates aspects of mobile-terminated packet transmissions in accordance with some embodiments.

FIG. 3 illustrates aspects of mobile-terminated packet transmissions in accordance with some embodiments. FIG. 3 illustrates a method using UE 301, RAN 302, SNC 306, DGWs 304A-N, services IWF system 308, SCS 310, and AS 312A-N, which may be similar to the elements of FIGS. 1-2. In other embodiments, other systems using similar elements, or different combinations of system elements, may be used.

In the embodiment illustrated by FIG. 3, just as above for FIG. 2, a message flow is established to UE 301 from a first AS 312A via a first DGW 304A and a node (e.g., an eNB) of RAN 302. This occurs in operations 320, 322, and 324. Operation 320 involves AS 312A configured for operations to communicate as described above. Operation 322 involves DGW 304A configured to manage elements of a message flow from AS 312A to UE 301 via RAN 302. Operation 324 involves UE 301 decoding and processing the message flow. Similar communications also occur in the opposite direction as described for FIG. 1. Also similarly, in response to the latest network load status, in operation 326 the SNC 306 configures routing polices on one or more DGWs 304A-N for the service flow of the service requested by UE 301.

Then in operation 327, SNC 306 receives one or more packets from the first boundary DGW 304A which originally served the service flow requested by AS 312A for operation 320 due to failing to forward the MT packets. This operates as an event to trigger the SNC 310 to perform notification procedure towards the SCS 310 via the service IWF system 308 in operation 328. As part of operation 328, the SNC 306 analyzes the received packets from operation 327 and provides the latest boundary DGW 304B address to the SCS 310 in a Network Configuration Information Notification (NCIN) message. In some embodiments, such a network NCIN message comprises a service ID, flow ID, and temporary mobile device ID, which are used to identify a MT service flow of a particular service for a mobile device (e.g., UE 301).

Similar to the operations of FIG. 2, according to the network configuration information about boundary DGW 304B address, the SCS 310 may analyze network configurations, latencies, or other such data in operation 330 and determine to change the AS from AS 312A to AS 312B, which is associated with the latest boundary DGW 304B. Additionally, the SCS 310 may communicate service flow-related information from the AS 312A in operation 331 and transfer the flow-related information to AS 312B in operation 332 so as to continue the service flow using the new AS (e.g., AS 312B), the new DGW (e.g., DGW 304B) and UE 101 in corresponding operations 334, 336, and 338 similar to the new service flow operations of FIG. 2.

In additional embodiments, for a service requiring infrequent transmission, the application server may send a MT service request via the SCS to obtain the latest information of the boundary DGW before it starts to transmit the MT packets. With such an approach, the latency could be improved.

Figure 4:
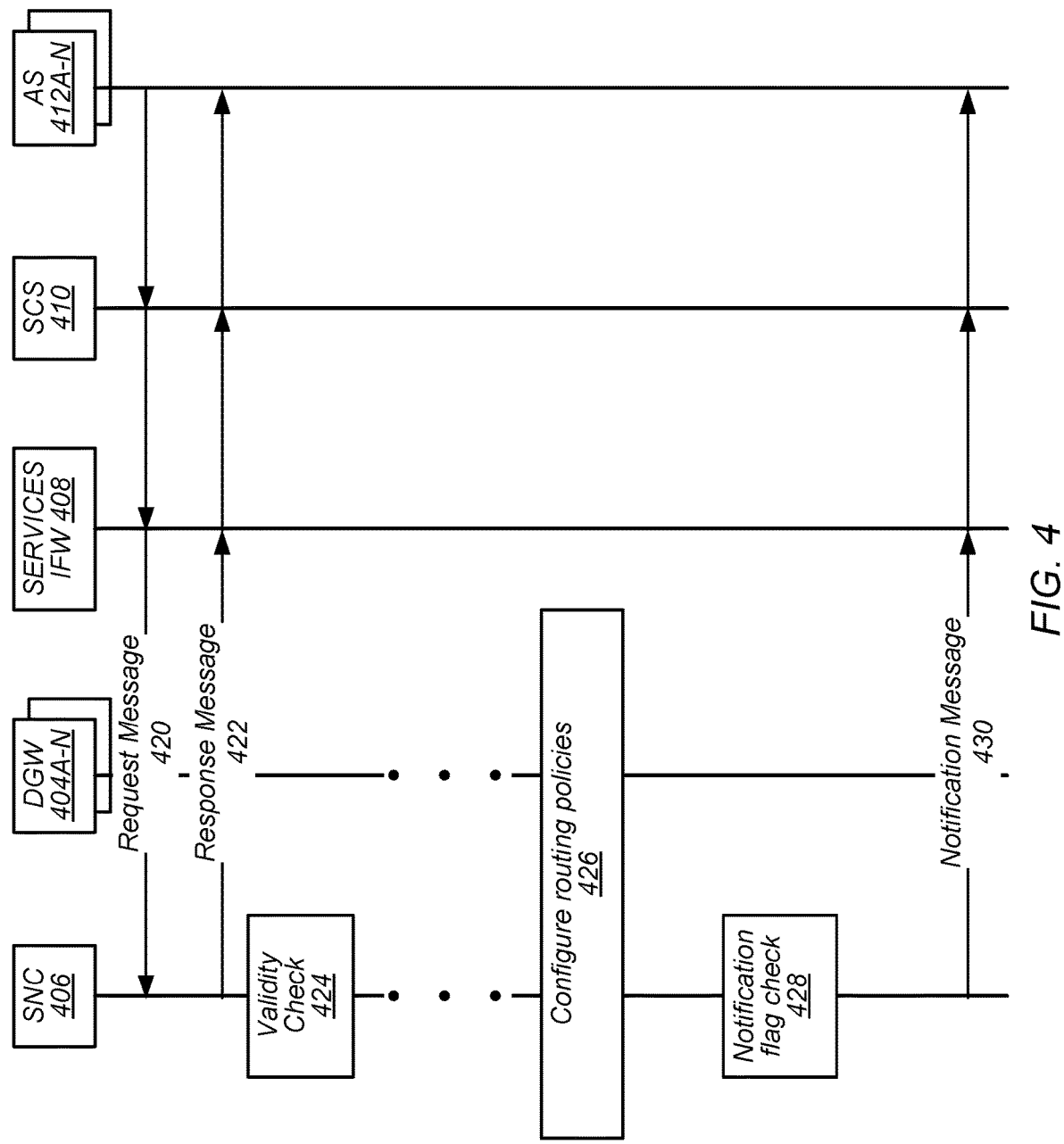
FIG. 4 illustrates aspects of mobile-terminated packet transmissions in accordance with some embodiments.

FIG. 4 shows one potential embodiment of a network configuration information notification procedure, which may be used to obtain the latest network configuration information from the SMN via a one-time query or an event trigger query. In the former case, the SCS or AS may request the current address information of the boundary DGW for the service flow at one time. In the latter case, the SCS or AS may request the latest address information of the boundary DGW for the service flow whenever there is a change.

FIG. 4 illustrates such a procedure with illustrated operations between SNC 406, DGWs 404A-N, services IWF 408, SCS 410, and AS 412A-N, which may again be similar to the corresponding elements described above, or may be implemented in various combinations including additional elements.

In operation 420, the SCS 410 and/or a first AS 412A of a plurality of ASs 412A-N sends a request message indicating service identity, flow ID, temporary mobile device ID, policy information type, and response type. The service identity indicates an ID for the requested service, which may be global unique or unique within the operator domain in the Public Land Mobile Network (PLMN). In some embodiments, the flow identity indicates, for the service flow for the service, an ID which may be allocated by the SNC 406 when establishing the service flow of the service. In some embodiments, a temporary mobile device ID is a temporary identity allocated by the operator to which may be unique within the serving PLMN. In some embodiments, a policy information type indicates the type of policy information that is requested. In some such embodiments, the SNC 406 replies with the address information of the DGW 404A for the MT packet transmission. A response type indicates the type of response that the SCS 410/AS 412A is requesting, such as an instant response or response only when there are any changes on the requested policy information.

If the response type indicates as instant response in operation 420, the SNC 406 replies with a response message (e.g., comprising service ID, temp device ID, policy info, etc.) to the SCS 410/AS 412A via the services IWF 408 in operation 422, wherein the policy information is the boundary DGW address (e.g., DGW 404A). After the SCS 410/AS 412A receives the response message, the procedure is stopped at operation 422 unless a flag or other setting indicates to continue. In other embodiments, such a flag is not used.

In operation 424, for the response message, there may be parameters to indicate the validity of the provided network configuration information. For example, a validity timer may indicate the allowable time to apply the network configuration, and the application server needs to request for authorization by a third message; a scheduled time for mobile-terminated packet transmission may be provided to request the mobile device for sending the packets via the network configuration information at a scheduled time. Such a value operates as a setting or flag in various embodiments.

When the response type indicates, then whenever there is a change, the SNC 306 sets a notification flag associated to the indicated service ID and the flow ID for the UE at operation 422 and continues with operation 424. In operation 426, the SNC 406 determines to configure the network with new routing polices on one or more DGWs 404A-N to reflect to the real-time or near real-time network load status.

As part of operation 428, SNC 406 checks the notification flag of operation 424 to see if the flag is set for the service flow and checks to determine if the associated boundary DGW 404A is changed. If the flag is set and the DGW 404A is changed to a different DGW, the SNC 406 will initiate the notification message in operation 430.

When operation 430 is triggered, the SNC 406 sends a response message (e.g., a communication comprising a service ID, temp device ID, and policy information) to the subscription repository to provide the policy information for the latest boundary DGW 404B address to the SCS 410, wherein the service ID, flow ID, and temporary mobile device ID are used to identify a MT service flow of a particular service for a mobile device. Additionally, in response to the routing polices update response message, the service-IWF system 408 may reply with a complete message with an optional indicator indicating when keeping the notification flag as active or setting it as inactive.

In some embodiments, when the application server receives the notification message with the latest boundary DGW address, the application server may start to transmit MT packets via the latest boundary DGW. According to the network configuration information about the boundary DGW address, the SCS 410 may determine to change the application server from a first AS 412A to a second AS 412B which is associated with the latest boundary DGW (e.g., DGW 404B). Additionally, the SNC 406 may retrieve service flow-related information from the AS 412A and transfer to the AS 412B so as to continue the service flow in communication operations 430.

Figure 5:
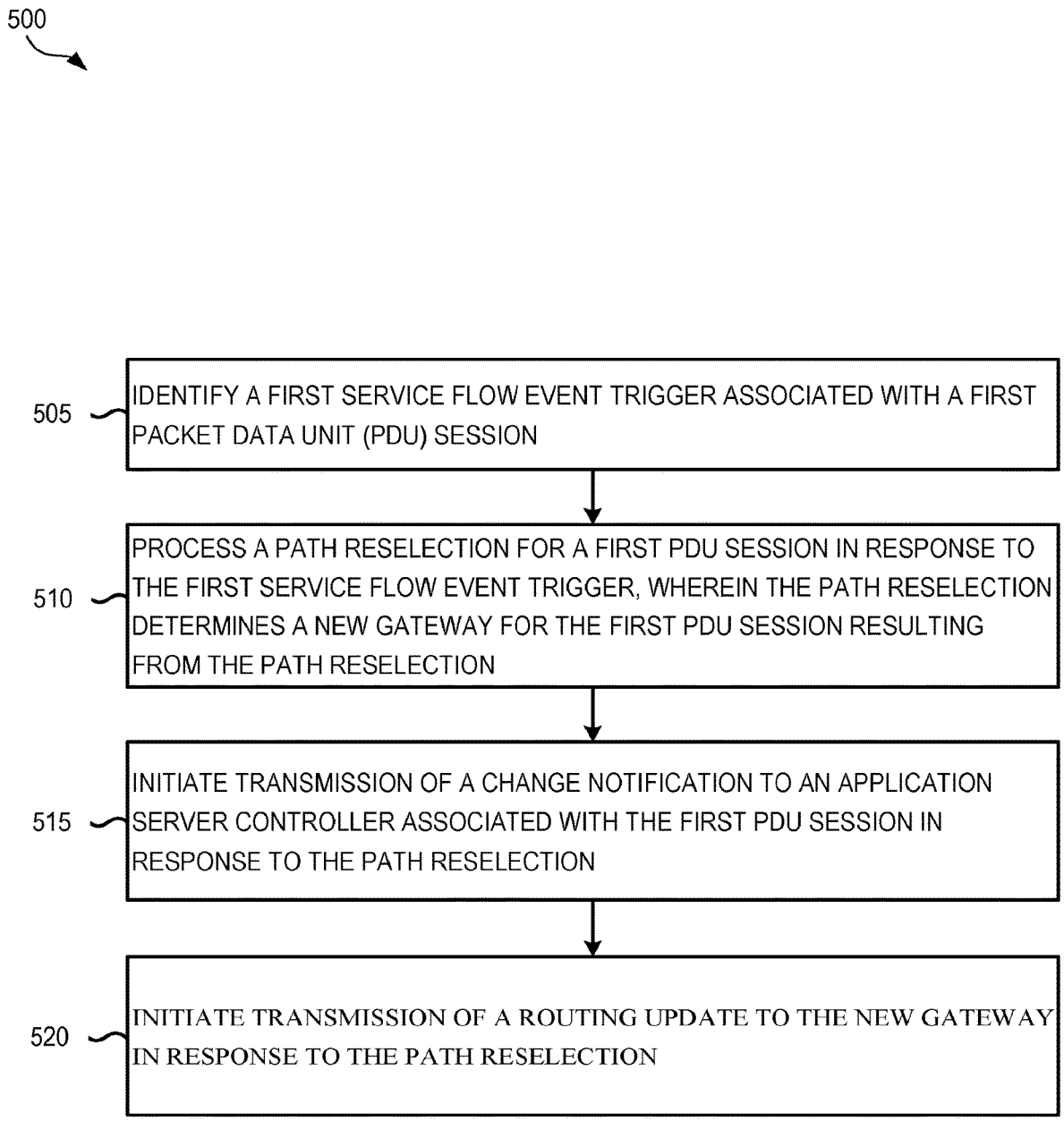
FIG. 5 illustrates one example method of mobile-terminated packet transmissions in accordance with some embodiments.

FIG. 5 illustrates one example method 500 of mobile-terminated packet transmissions in accordance with some embodiments. In some embodiments, method 500 is implemented by an apparatus of a control plane device (e.g., a baseband integrated circuit (IC) or an IC including baseband circuitry with associated memory). In some embodiments, method 500 is implemented as instructions in a processor-readable storage medium. In further embodiments, a device or server implements a control plane device in an evolved packet core or next generation core; or an SDN-based network controller device may implement method 500.

Method 500 begins with operation 505 where circuitry operates to identify a first service flow event trigger associated with a first packet data unit (PDU) session (e.g., a first service flow). Examples of service flow triggers include load balancing events where service flows are distributed between gateways for improved performance, UE mobility events where service flows are adjusted in response to UE movement, quality of service based event triggers for system performance, and path reselection requests initiated by AS systems (e.g., an AS controller or an SCS).

A path reselection for a first PDU session is then processed in operation 510 in response to the first service flow event trigger of operation 505, wherein the path reselection of operation 510 determines a new gateway for the first PDU session resulting from the path reselection.

Operation 515 follows with transmission of a change notification to an application server controller (e.g., an SCS) associated with the first PDU session in response to the path reselection. In operation 520, transmission of a routing update to the new DGW is initiated in response to the path reselection. As described above, in various embodiments, the change notification for the application server controller may include a service identifier (ID), a flow ID, and a temporary mobile device ID to be used to identify a mobile termination (MT) for the service flow of the UE.

Figure 6:
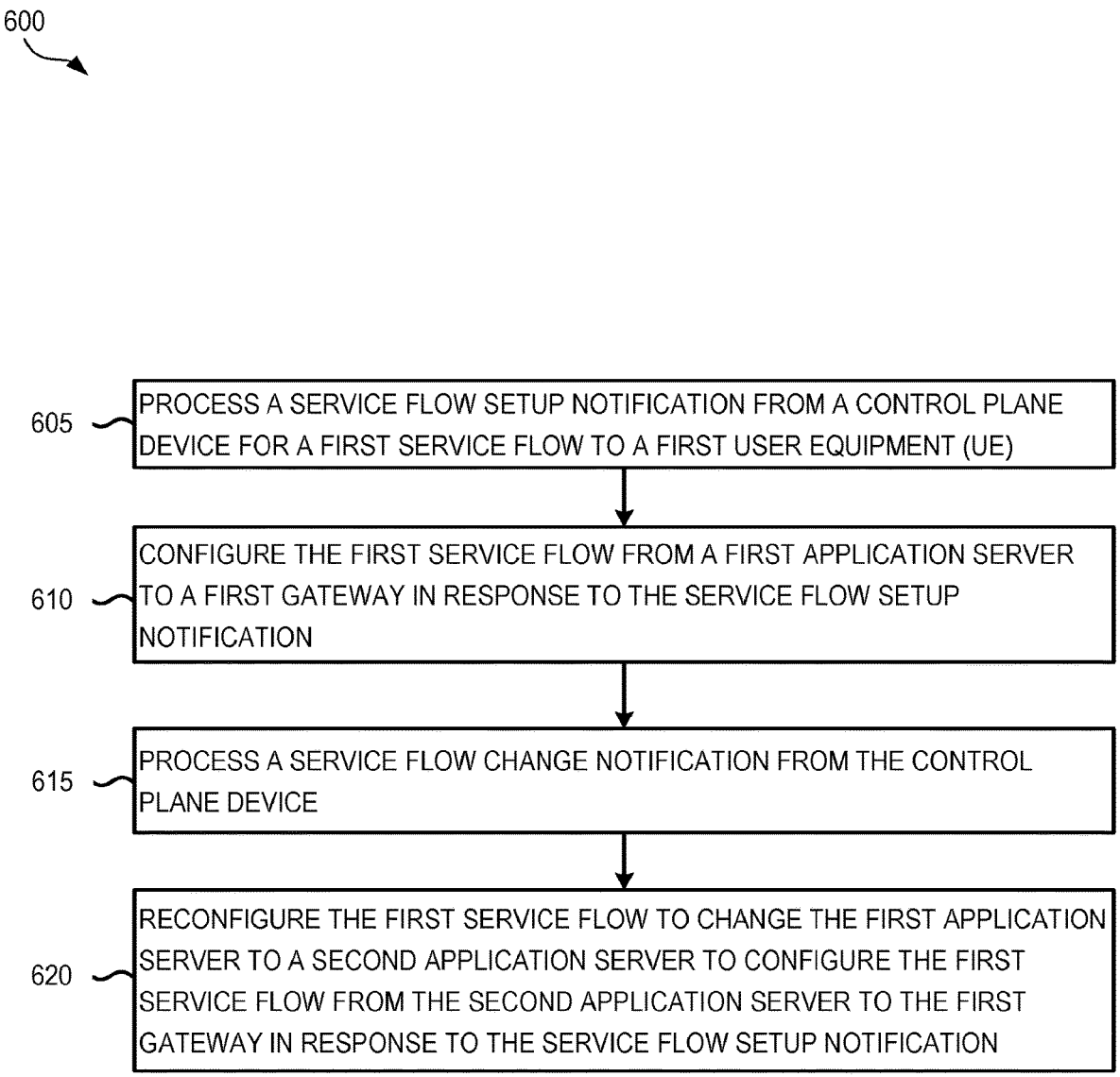
FIG. 6 illustrates one example method of mobile-terminated packet transmissions in accordance with some embodiments.

FIG. 6 illustrates another example method 600 of mobile-terminated packet transmissions in accordance with some embodiments. Method 600 describes a complementary method that may be performed by an SCS or application server controller in conjunction with SNC operations of method 500 above or method 700 below. In some embodiments, method 600 is implemented by an apparatus of an SCS or AS controller (e.g., a baseband integrated circuit (IC) or an IC including baseband circuitry with associated memory in such systems). In some embodiments, method 600 is implemented as instructions in a processor-readable storage medium. In various embodiments, any machine or device described herein, such as machine 900 of FIG. 9 or UE 1000 of FIG. 10, may be specially configured to implement various embodiments such as method 600.

Method 600 begins with operation 605 to decode/process a service flow setup notification (e.g., a user plane (UP) setup information) from a control plane device for a first service flow (e.g., a first PDN connection) to a first UE. Then in operation 610, the first service flow is configured for the service flow from a first application server to a first gateway in response to the service flow setup notification. In operation 615 a service flow change notification from the control plane device is decoded and processed at the AS controller.

The first service flow is then reconfigured in operation 620 to change the first application server to a second application server, which configures the first service flow from the second application server to the first gateway in response to the service flow setup notification.

FIG. 7 illustrates another example method 700 of mobile-terminated packet transmissions in accordance with some embodiments. Just as described above for FIG. 5, in some embodiments method 700 is implemented by an apparatus of a control plane device (e.g., a baseband integrated circuit (IC) or an IC including baseband circuitry with associated memory). In some embodiments, method 700 is implemented as instructions in a processor-readable storage medium. In further embodiments, a device or server implementing a control plane device in an LTE evolved packet core or next generation core, or an SDN-based network controller device, may implement method 700. In various embodiments, any machine or device described herein, such as machine 900 or UE 1000, may be specially configured to implement various embodiments such as method 700.

In method 700, a routing policy is configured in operation 705 for one or more data gateways (DGWs), wherein the routing policy is to indicate a second DGW to take over service, from a first DGW, of a service flow of a user equipment (UE), wherein the first DGW and the second DGW are among the one or more DGWs. A notification procedure is then configured in operation 710 including sending a request to perform the notification procedure to a services capability server (SCS) via a services interworking function (services-IWF).

Operation 715 then involves transmitting a NCIN message to the SCS (e.g., UP setup notification information to the AS controller), wherein the NCIN message includes a service identifier (ID), flow ID, and temporary mobile device ID to be used to identify a mobile termination (MT) for the service flow of the UE.

In various other embodiments, in any of the methods described above, various operations may be repeated, or separated by other operations. The operations may additionally be performed by one or more processors coupled to one or more associated memories in any way to implement such operations. Such operations may thus be implemented by the specially configured circuitry of an apparatus in any machine or apparatus described herein such as machine 900 of FIG. 9 or the UE 1000 of FIG. 10.

EXAMPLE EMBODIMENTS

Example 1 may include a Method for handling Mobile-Terminated Packet Transmission in a software defined network (SDN)-based Mobile Network for a first network entity is to trigger a notification procedure to provide a second network entity the network configuration information for mobile-terminated packet transmission according to the latest network configuration.

Example 2 may include the method of example 1 or some other example herein, wherein the network configuration information is the address of one or more boundary data gateway per flow of the service.

Example 3 may include the method of example 2 or some other example herein, wherein the service flow is identified by at least one of the following information: service identity, flow identity, temporary mobile device identity.

Example 4 may include the method of example 3 or some other example herein, wherein the notification procedure is triggered by the first network entity by detecting at least one of the following event: a boundary DGW of the service flow is changed, the first network entity receives one or more packets sending from the first boundary DGW which may indicate the failure forwarding polices, a notification flag is set as active.

Example 5 may include a Method and Apparatus for handling Mobile-Terminated Packet Transmission in a SDN-based Mobile Network for a first network entity is to trigger a notification procedure by sending a first message to a second network entity about the network configuration information for mobile-terminated packet transmission when receiving a second message from the second network entity.

Example 6 may include the method of example 5 or some other example herein, wherein the network configuration information is the address of one or more boundary data gateway per flow of the service, wherein the service flow is identified by at least one of the following information: service identity, flow identity, temporary mobile device identity.

Example 7 may include the method of example 6 or some other example herein, wherein the second message includes at least one of the following information: service identity, flow ID, temporary mobile device ID, policy info type, and response type; wherein the response type indicates the expected response message is for instant one-time report or whenever there is a change on the requested policy info type.

Example 8 may include the method of example 7 or some other example herein, wherein the first message is in responding to the received second message, and may contain at least one of the following information: temporary mobile device identity, service identity, network configuration information, a validity timer for the provided network configuration, and a scheduled time for mobile-terminated packet transmission; wherein the validity timer indicates the allowable time to apply the network configuration, and the application server needs to request for authorization by a third message; the scheduled time for mobile-terminated packet transmission is provided to request the mobile device for sending the packets via the network configuration information at a scheduled time.

Example 9 may include a method to be performed by a Software Defined Network (SDN) Network Controller (SNC) comprising: configuring or causing to configure a routing policy for one or more data gateways (DGWs), wherein the routing policy is to indicate a second DGW to take over service, from a first DGW, of a service flow of a user equipment (UE), wherein the first DGW and the second DGW are among the one or more DGWs; initiating or causing to initiate a notification procedure including sending a request to perform the notification procedure to a services capability server (SCS) via a services interworking function (services-IWF).

Example 10 may include the method of example 9 and/or some other examples herein, wherein the method further comprises: transmitting or causing to transmit a Network Configuration Information Notification (NCIN) message to the SCS, wherein the NCIN message includes a service identifier (ID), flow ID, and temp mobile device ID to be used to identify a mobile termination (MT) for the service flow of the UE, wherein the SCS is to determine, based on the NCIN message, to change a serving Application Server (AS) for the service flow to a second AS from a first AS, wherein the second AS is associated with the second DGW, wherein the SCS is to retrieve service flow related information from the a second AS and transfer the service flow related information to the first AS so as to continue the service of the service flow, and wherein the first AS is to start to transmit mobile-terminated packets via the first DGW.

Example 11 may include the method of example 10 and/or some other examples herein, further comprising: detecting or causing to detect a trigger event, wherein the initiating is based on the trigger event, and wherein the trigger event includes the configuring of the routing polices on the one or more DGWs.

Example 12 may include the method of example 10 and/or some other examples herein, further comprising: detecting or causing to detect a trigger event, wherein the initiating is based on the trigger event, and wherein the trigger event includes receiving, by the SNC, one or more packets from the first DGW which originally served the service flow requested by the first AS, wherein the one or more packets are to be sent by the first DGW due to a failure.

Example 13 may include the method of example 12 and/or some other examples herein, further comprising: analyzing the received one or more packets; and providing or causing to provide, a latest boundary DGW address to the SCS in the NCIN message, wherein the service ID, flow ID, and temp mobile device ID are used to identify a MT service flow of the service flow.

Example 14 may include the method of example 13 and/or some other examples herein, wherein, based on the boundary DGW address in the NCIN message, the SCS is to determine to change a serving AS from the first AS to the second AS wherein the latest boundary DGW is the second DGW, and the SCS is to retrieve service flow related information from the first AS and transfer the service flow related information to the second AS.

Example 15 may include the method of example 13 or 14 and/or some other examples hercin, wherein, the second AS is to send an MT service request via the SCS to obtain the latest information of the latest boundary DGW before the latest boundary DGW begins transmission of MT packets.

Example 16 may include the method of one of examples 9-13 and/or some other examples herein, further comprising: receiving or causing to receive, from the SCS or an AS of a plurality of ASs, a request message indicating a service ID, the flow ID, the temporary mobile device ID, policy info type, and/or a response type; and when the response type indicates an instant response, transmitting or causing to transmit a response message to the SCS or the AS via the Service-IWF.

Example 17 may include the method of one of examples 9-13 and/or some other examples herein, further comprising: receiving or causing to receive, from the SCS or an AS of a plurality of ASs, a request message indicating a service ID, the flow ID, the temporary mobile device ID, policy info type, and/or a response type; and when the response type indicates there is a change, setting or causing to set a notification flag associated with the service ID and the flow ID; determining or causing to determine to configure new routing polices for the one or more DGWs based on a real-time network load status; updating or causing to update a reconfiguration by updating the routing policies to the new routing policies based on the determining; determining or causing to determine whether the notification flag is set for the service flow and whether the associated boundary DGW has changed; transmitting or causing to transmit the NCIN message when the notification flag is set for the service flow and when the associated boundary DGW has changed.

Example 18 may include the method of example 17 and/or some other examples herein, wherein the transmitting or causing to transmit the NCIN message comprises: transmitting or causing to transmit a response message including the service ID, the temp mobile device ID, the Policy Info to the services-IWF to provide the Policy info for the latest boundary DGW address to the SCS, wherein the service ID, the flow ID, and the temp mobile device ID are used to identify a MT service flow of the service.

Example 19 may include the method of examples 17 or 18 and/or some other examples hercin, wherein, in response to a Routing Polices Update Response message, the Service-IWF is to send a Complete message with an optional indicator indicating whether the notification flag should be kept active to set the notification flag as inactive.

Example 20 may include the method of any one of examples 16-19 and/or some other examples herein, wherein the service identity indicates an ID for a requested service, which is global unique or unique within an operator domain in a Public Land Mobile Network (PLMN); the flow identity indicates an ID of the service flow for the service which is allocated by the SNC when establishing the service flow of the service; the temporary mobile device ID is a temporary identity allocated by the operator domain which is unique within a serving PLMN; the policy information type indicates a type of policy information that is requested; and the response type indicates a type of response that the SCS and/or AS requests including an instant response or response only when there are any changes to the requested policy information.

Example 21 may include the method of any one of examples 16-20 and/or some other examples herein, wherein the policy information indicates an address of the latest boundary DGW.

Example 22 may include the method of any one of examples 16-21 and/or some other examples herein, wherein the response message includes parameters to indicate a validity period of the provided network configuration information, wherein a validity timer is to indicate an allowable time to apply the network configuration, and wherein the validity period is to indicate a scheduled time for MT packet transmission to request the UE to send the MT packets via the network configuration information at the scheduled time.

Example 23 may include the method of any one of examples 16-22 and/or some other examples herein, wherein the first AS and the second AS are to communicate with the SCS over a Z7 interface, wherein the SCS is to communicate with the Service-1WF over a Z8 interface, wherein the Service-IWF is to communicate with a radio access network (RAN) node over a Z3 interface, wherein the Service-IWF is to communicate with a subscription repository over a Z6b interface, wherein the Service-IWF is to communicate with the SNC over a Z4 interface, wherein the SNC is to communicate with the subscription repository over a Z6a interface, wherein the SNC is to communicate with the RAN node over a Z1 interface, and wherein the SNC is to communicate with the first DGW and the second DGW over a Z5 interface.

Example 24 may include an apparatus to be implemented by a Software Defined Network (SDN) Network Controller (SNC) comprising: control circuitry to configure a routing policy for one or more data gateways (DGWs), wherein the routing policy is to indicate a second DGW to take over service, from a first DGW, of a service flow of a user equipment (UE), wherein the first DGW and the second DGW are among the one or more DGWs; and initiate a notification procedure including sending a request to perform the notification procedure to a services capability server (SCS) via a services interworking function (services-IWF).

Example 25 may include the apparatus of example 24 and/or some other examples herein, wherein the control circuitry is to control interface circuitry to transmit a Network Configuration Information Notification (NCIN) message to the SCS, wherein the NCIN message includes a service identifier (ID), flow ID, and temp mobile device ID to be used to identify a mobile termination (MT) for the service flow of the UE, wherein the SCS is to determine, based on the NCIN message, to change a serving Application Server (AS) for the service flow to a second AS from a first AS, wherein the second AS is associated with the second DGW, wherein the SCS is to retrieve service flow related information from the a second AS and transfer the service flow related information to the first AS so as to continue the service of the service flow, and wherein the first AS is to start to transmit mobile-terminated packets via the first DGW.

Example 26 may include the apparatus of example 25 and/or some other examples herein, wherein the control circuitry is to detect a trigger event, wherein the initiating is based on the trigger event, and wherein the trigger event includes the configuring of the routing polices on the one or more DGWs.

Example 27 may include the apparatus of example 25 and/or some other examples herein, wherein the control circuitry is to detect a trigger event, wherein the initiating is based on the trigger event, and wherein the trigger event includes receiving, by the SNC, one or more packets from the first DGW which originally served the service flow requested by the first AS, wherein the one or more packets are to be sent by the first DGW due to a failure.

Example 28 may include the apparatus of example 27 and/or some other examples herein, wherein the control circuitry is to analyze the received one or more packets; and provide, a latest boundary DGW address to the SCS in the NON message, wherein the service ID, flow ID, and temp mobile device ID are used to identify a MT service flow of the service flow.

Example 29 may include the apparatus of example 28 and/or some other examples herein, wherein, based on the boundary DGW address in the NCIN message, the SCS is to determine to change a serving AS from the first AS to the second AS wherein the latest boundary DGW is the second DGW, and the SCS is to retrieve service flow related information from the first AS and transfer the service flow related information to the second AS.

Example 30 may include the apparatus of example 28 or 29 and/or some other examples herein, wherein, the second AS is to send an MT service request via the SCS to obtain the latest information of the latest boundary DGW before the latest boundary DGW begins transmission of MT packets.

Example 31 may include the apparatus of one of examples 24-28 and/or some other examples herein, wherein the control circuitry is to control the interface circuitry to receive, from the SCS or an AS of a plurality of ASs, a request message indicating a service ID, the flow ID, the temporary mobile device ID, policy info type, and/or a response type; and when the response type indicates an instant response, the control circuitry is to control the interface circuitry to transmit a response message to the SCS or the AS via the Service-IWF.

Example 32 may include the apparatus of one of examples 24-28 and/or some other examples herein, wherein the control circuitry is to control the interface circuitry to receive, from the SCS or an AS of a plurality of ASs, a request message indicating a service ID, the flow ID, the temporary mobile device ID, policy info type, and/or a response type; and when the response type indicates there is a change, the control circuitry is to set a notification flag associated with the service ID and the flow ID; determine to configure new routing polices for the one or more DGWs based on a real-time network load status; update a reconfiguration by updating the routing policies to the new routing policies based on the determining; determine whether the notification flag is set for the service flow and whether the associated boundary DGW has changed; and control the interface circuitry to transmit the NCIN message when the notification flag is set for the service flow and when the associated boundary DGW has changed.

Example 33 may include the apparatus of example 32 and/or some other examples herein, wherein the control circuitry is to control the interface circuitry to transmit a response message including the service ID, the temp mobile device ID, the Policy Info to the services-IWF to provide the Policy info for the latest boundary DGW address to the SCS, wherein the service ID, the flow ID, and the temp mobile device ID are used to identify a MT service flow of the service.

Example 34 may include the apparatus of examples 32 or 33 and/or some other examples herein, wherein, in response to a Routing Polices Update Response message, the Service-IWF is to send a Complete message with an optional indicator indicating whether the notification flag should be kept active to set the notification flag as inactive.

Example 35 may include the apparatus of any one of examples 31-34 and/or some other examples herein, wherein the service identity indicates an ID for a requested service, which is global unique or unique within an operator domain in a Public Land Mobile Network (PLMN); the flow identity indicates an ID of the service flow for the service which is allocated by the SNC when establishing the service flow of the service; the temporary mobile device ID is a temporary identity allocated by the operator domain which is unique within a serving PLMN; the policy information type indicates a type of policy information that is requested; and the response type indicates a type of response that the SCS and/or AS requests including an instant response or response only when there are any changes to the requested policy information.

Example 36 may include the apparatus of any one of examples 31-20 and/or some other examples herein, wherein the policy information indicates an address of the latest boundary DGW.

Example 37 may include the apparatus of any one of examples 31-21 and/or some other examples herein, wherein the response message includes parameters to indicate a validity period of the provided network configuration information, wherein a validity timer is to indicate an allowable time to apply the network configuration, and wherein the validity period is to indicate a scheduled time for MT packet transmission to request the UE to send the MT packets via the network configuration information at the scheduled time.

Example 38 may include the apparatus of any one of examples 31-22 and/or some other examples herein, wherein the first AS and the second AS are to communicate with the SCS over a Z7 interface, wherein the SCS is to communicate with the Service-IWF over a Z8 interface, wherein the Service-IWF is to communicate with a radio access network (RAN) node over a Z3 interface, wherein the Service-IWF is to communicate with a subscription repository over a Z6b interface, wherein the Service-IWF is to communicate with the SNC over a Z4 interface, wherein the SNC is to communicate with the subscription repository over a Z6a interface, wherein the SNC is to communicate with the RAN node over a Z1 interface, and wherein the SNC is to communicate with the first DGW and the second DGW over a Z5 interface.

Example 39 may include an apparatus comprising means to perform one or more elements of a method described in or related to any of examples 1-23, or any other method or process described herein.

Example 40 may include one or more non-transitory computer-readable media comprising instructions to cause an electronic device, upon execution of the instructions by one or more processors of the electronic device, to perform one or more elements of a method described in or related to any of examples 1-23, or any other method or process described herein.

Example 41 may include an apparatus comprising logic, modules, and/or circuitry to perform one or more elements of a method described in or related to any of examples 1-23, or any other method or process described herein.

Example 42 may include a method, technique, or process as described in or related to any of examples 1-23, or portions or parts thereof.

Example 43 may include an apparatus comprising: one or more processors and one or more computer readable media comprising instructions that, when executed by the one or more processors, cause the one or more processors to perform the method, techniques, or process as described in or related to any of examples 1-23, or portions thereof.

Example 44 may include a method of communicating in a wireless network as shown and described herein.

Example 45 may include a system for providing wireless communication as shown and described herein.

Example 46 may include a device for providing wireless communication as shown and described herein.

Example 47 is apparatus for handling Mobile-Terminated Packet Transmission in a SDN-based Mobile Network for a first network entity is to trigger a notification procedure to provide a second network entity the network configuration information for mobile-terminated packet transmission according to the latest network configuration.

Example 48 is the network configuration information is the address of one or more boundary data gateway per flow of the service.

Example 49 is the service flow is identified by at least one of the following information: service identity, flow identity, temporary mobile device identity.

Example 50 is the notification procedure is triggered by the first network entity by detecting at least one of the following event: a boundary DGW of the service flow is changed, the first network entity receives one or more packets sending from the first boundary DGW which may indicate the failure forwarding polices, a notification flag is set as active.

Example 51 is apparatus for handling Mobile-Terminated Packet Transmission in a SDN-based Mobile Network for a first network entity is to trigger a notification procedure by sending a first message to a second network entity about the network configuration information for mobile-terminated packet transmission when receiving a second message from the second network entity.

Example 52 is the network configuration information is the address of one or more boundary data gateway per flow of the service, wherein the service flow is identified by at least one of the following information: service identity, flow identity, temporary mobile device identity.

Example 53 is the second message includes at least one of the following information: service identity, flow ID, temporary mobile device ID, policy info type, and response type; wherein the response type indicates the expected response message is for instant one-time report or whenever there is a change on the requested policy info type.

Example 54 is the first message is in responding to the received second message, and may contain at least one of the following information: temporary mobile device identity, service identity, network configuration information, a validity timer for the provided network configuration, and a scheduled time for mobile-terminated packet transmission; wherein the validity timer indicates the allowable time to apply the network configuration, and the application server needs to request for authorization by a third message; the scheduled time for mobile-terminated packet transmission is provided to request the mobile device for sending the packets via the network configuration information at a scheduled time.

Example 55 is an apparatus of a control plane device configured to operate within an evolved packet network core, the apparatus comprising: a memory; and processing circuitry in communication with the memory and arranged to: identify a first service flow event trigger associated with a first packet data unit (PDU) session; process a path reselection for the first PDU session in response to the first service flow event trigger, wherein the path reselection determines a new gateway for the first PDU session resulting from the path reselection; initiate transmission of a change notification to an Application Server (AS) controller associated with the first PDU session in response to the path reselection; and initiate transmission of a routing update to the new gateway in response to the path reselection.

In Example 56, the subject matter of Example 55 optionally includes wherein the memory is configured to store an identifier associated with the first PDU session; and wherein the first service flow event trigger comprises a load balancing event.

In Example 57, the subject matter of any one or more of Examples 55-56 optionally include wherein the first service flow event trigger comprises a user equipment mobility event.

In Example 58, the subject matter of any one or more of Examples 55-57 optionally include wherein the first service flow event trigger comprises receipt of a path reselection request from the AS controller.

In Example 59, the subject matter of any one or more of Examples 55-58 optionally include-4 wherein the processing circuitry is further arranged to: process a PDU session establishment request from a first user equipment (UE); and initiate establishment of the first PDU session using a first gateway in response to the PDU session establishment request prior to receipt of the first service flow event trigger.

In Example 60, the subject matter of Example 59 optionally includes wherein the processing circuitry is further arranged to initiate establishment of a second PDU session for the first UE.

In Example 61, the subject matter of Example 60 optionally includes wherein the processing circuitry further manages internet protocol (IP) address assignments for the first UE as part of the path reselection.

In Example 62, the subject matter of any one or more of Examples 59-61 optionally include wherein the processing circuitry is further arranged to: configure a set of routing policies on at least the first gateway and the new gateway prior to receipt of the first service flow event trigger.

In Example 63, the subject matter of any one or more of Examples 55-62 optionally include-4 wherein the processing circuitry is further arranged to: process a change notification from the AS controller indicating reallocation of the first PDU session from a first application server to a second application server; wherein the routing update to the new gateway further comprises the change notification.

In Example 64, the subject matter of any one or more of Examples 55-63 optionally include-2 and 4 wherein the first service flow event trigger comprises a gateway failure event.

In Example 65, the subject matter of any one or more of Examples 55-64 optionally include and 3 wherein the first service flow event trigger comprises a quality of service latency trigger associated with a mission-critical latency threshold.

In Example 66, the subject matter of any one or more of Examples 55-65 optionally include, further comprising: an antenna configured to transmit a routing update to the new gateway; and radio frequency (RF) circuitry coupling the processing circuitry to the antenna; wherein the processing circuitry is configured as part of baseband circuitry of the apparatus.

Example 67 is a computer-readable storage medium comprising instructions that, when executed by one or more processors, cause an apparatus of a Software-Defined Network (SDN) Network Controller (SNC) to perform operations within a long-term evolution (LTE) evolved packet core (EPC) network, the apparatus configured to: identify a first event associated with a first service flow for a user equipment (UE), the event comprising a load balancing event or a mobility event; process a path reselection for the first service flow in response to the first event, wherein the path reselection determines a new data gateway (D-GW) for the first service flow resulting from the path reselection; initiate transmission of a change notification to a Service Capability Server (SCS) serving an Application Server (AS), wherein the AS is associated with the first service flow in response to the path reselection; and initiate transmission of a routing update to the new D-GW in response to the path reselection.

In Example 68, the subject matter of Example 67 optionally includes wherein change notification for the SCS includes a service identifier (ID), a flow ID, and a temporary mobile device ID to be used to identify a mobile termination (MT) for the first service flow of the UE.

In Example 69, the subject matter of any one or more of Examples 67-68 optionally include wherein the first event associated with the first service flow comprises a load balancing event or a user equipment mobility event; and wherein the processing circuitry is further arranged to: process a packet data unit (PDU) session establishment request from a first UE; initiate establishment of a first PDU session using a first gateway in response to the PDU session establishment request prior to receipt of the first service flow event trigger; and initiate establishment of a second PDU session for the first UE.

Example 70 is a method to be performed by a Software Defined Network (SDN) Network Controller (SNC) comprising: configuring a routing policy for one or more data gateways (DGWs), wherein the routing policy is to indicate a second DGW to take over service, from a first DGW, of a service flow of a user equipment (UE), wherein the first DGW and the second DGW are among the one or more DGWs; initiating a notification procedure including sending a request to perform the notification procedure to a services capability server (SCS) via a services interworking function (services-IWF); and transmitting a Network Configuration Information Notification (NCIN) message to the SCS, wherein the NCIN message includes a service identifier (ID), flow ID, and temporary mobile device ID to be used to identify a mobile termination (MT) for the service flow of the UE.

In Example 71, the subject matter of Example 70 optionally includes wherein the SCS is to determine, based on the NCIN message, to change a serving Application Server (AS) for the service flow to a second AS from a first AS, wherein the second AS is associated with the second DGW; wherein the SCS is to retrieve service flow-related information from the second AS and transfer the service flow-related information to the first AS so as to continue the service of the service flow, and wherein the first AS is to start to transmit mobile-terminated packets via the first DGW.

In Example 72, the subject matter of any one or more of Examples 70-71 optionally include further comprising: detecting a trigger event, wherein the initiating is based on the trigger event, and wherein the trigger event includes receiving, by the SNC, one or more packets from the first DGW which originally served the service flow requested by the first AS, wherein the one or more packets are to be sent by the first DGW due to a failure; analyzing the received one or more packets; and providing, or causing to provide, a latest boundary DGW address to the SCS in the NCIN message, wherein the service ID, flow ID, and temporary mobile device ID are used to identify the MT for the service flow of the UE; wherein, based on the boundary DGW address in the NCIN message, the SCS is to determine to change a serving AS from the first AS to the second AS wherein the latest boundary DGW address is the second DGW, and the SCS is to retrieve service flow-related information from the first AS and transfer the service flow-related information to the second AS; and wherein the second AS is to send an MT service request via the SCS to obtain the latest information of the latest boundary DGW address before the latest boundary DGW address begins transmission of MT packets.

In Example 73, the subject matter of any one or more of Examples 70-72 optionally include further comprising: receiving, from the SCS or an AS of a plurality of ASs, a request message indicating a service ID, the flow ID, the temporary mobile device ID, policy information type, and/or a response type; when the response type indicates there is a change, setting a notification flag associated with the service ID and the flow ID; determining new routing polices for the one or more DGWs based on a real-time network load status; updating a reconfiguration by updating routing policies to the new routing policies based on the determining; determining whether the notification flag is set for the service flow and whether an associated boundary DGW has changed;

and transmitting the NCIN message when the notification flag is set for the service flow and when the associated boundary DGW has changed.

In Example 74, the subject matter of Example 73 optionally includes, wherein the transmitting the NCIN message comprises: transmitting a response message including the service ID, the temporary mobile device ID, and the policy information to the services-IWF to provide policy information for the latest boundary DGW address to the SCS, wherein the service ID, the flow ID, and the temporary mobile device ID are used to identify an MT service flow of the service; wherein, in response to a Routing Polices Update Response message, the services-IWF is to send a Complete message with an optional indicator indicating whether the notification flag should be kept active to set the notification flag as inactive; wherein the service ID indicates an identity for a requested service, which is global unique or unique within an operator domain in a Public Land Mobile Network (PLMN); the flow ID indicates an identity of the service flow for the service which is allocated by the SNC when establishing the service flow of the service; the temporary mobile device ID is a temporary identity allocated by an operator domain which is unique within a serving PLMN; the policy information type indicates a type of policy information that is requested; and the response type indicates a type of response that the SCS and/or AS requests including an instant response or response only when there are any changes to requested policy information; and wherein the policy information indicates the latest boundary DGW address.

In Example 75, the subject matter of Example 74 optionally includes wherein the response message includes parameters to indicate a validity period of provided network configuration information, wherein a validity timer is to indicate an allowable time to apply a network configuration, and wherein the validity period is to indicate a scheduled time for MT packet transmission to request the UE to send MT packets via the network configuration information at the scheduled time.

Example 76 is an apparatus of a Service Capability Server (SCS), the apparatus comprising: a memory; and processing circuitry in communication with the memory and arranged to: process a service flow setup notification from a control plane device for a first service flow to a first user equipment (UE);
configure the first service flow from a first application server to a first gateway in response to the service flow setup notification; process a service flow change notification from the control plane device; and reconfigure the first service flow to change the first application server to a second application server to configure the first service flow from the second application server to the first gateway in response to the service flow setup notification.

In Example 77, the subject matter of Example 76 optionally includes wherein the service flow setup notification comprises user plane (UP) setup notification information for the first UE.

Example 78 is an apparatus of a control plane device configured to operate within an evolved packet network core, the apparatus comprising:
means for identifying a first service flow event trigger associated with a first packet data unit (PDU) session; means for processing a path reselection for the first PDU session in response to the first service flow event trigger, wherein the path reselection determines a new gateway for the first PDU session resulting from the path reselection; and means for initiating transmission of a change notification to an Application Server (AS) controller associated with the first PDU session in response to the path reselection and transmission of a routing update to the new gateway in response to the path reselection.

In Example 79, the subject matter of Example 78 optionally includes further comprising a memory is configured to store an identifier associated with the first PDU session; wherein the first service flow event trigger comprises a load balancing event.

In Example 80, the subject matter of any one or more of Examples 78-79 optionally include wherein the first service flow event trigger comprises a user equipment mobility event.

In Example 81, the subject matter of any one or more of Examples 78-80 optionally include wherein the first service flow event trigger comprises receipt of a path reselection request from the AS controller.

In Example 82, the subject matter of Example undefined optionally includes further comprising: means for processing a PDU session establishment request from a first user equipment (UE); and means for initiating establishment of the first PDU session using a first gateway in response to the PDU session establishment request prior to receipt of the first service flow event trigger.

In Example 83, the subject matter of any one or more of Examples 78-82 optionally include further comprising means for establishing a second PDU session for the first UE copending with the first PDU session.

In Example 84, the subject matter of Example 83 optionally includes further comprising means for internet protocol (IP) address assignments for the first UE as part of the path reselection.

In Example 85, the subject matter of any one or more of Examples 83-84 optionally include further comprising means for configuring a set of routing policies on at least the first gateway and the new gateway prior to receipt of the first service flow event trigger.

In Example 86, the subject matter of any one or more of Examples 78-85 optionally include further comprising: means for processing a change notification from the AS controller indicating reallocation of the first PDU session from a first application server to a second application server; wherein the routing update to the new gateway further comprises the change notification.

In Example 87, the subject matter of any one or more of Examples 78-86 optionally include, further comprising: an antenna configured to transmit a routing update to the new gateway; application processing circuitry configured to use data from the first PDU session; and a display configure to display a user interface using at least a portion of the data from the first PDU session.

Example 88 is a method for Software-Defined Network (SDN) Network Controller (SNC) operations within a long-term evolution (LTE) evolved packet core (EPC) network, the method comprising: identifying, using processing circuitry, a first event associated with a first service flow for a user equipment (UE), the event comprising a load balancing event or a mobility event; processing, using the processing circuitry, a path reselection for the first service flow in response to the first event, wherein the path reselection determines a new data gateway (D-GW) for the first service flow resulting from the path reselection; initiating transmission, using the processing circuitry, of a change notification to a Service Capability Server (SCS) serving an Application Server (AS), wherein the AS is associated with the first service flow in response to the path reselection; and initiating transmission, using the processing circuitry, of a routing update to the new D-GW in response to the path reselection.

In Example 89, the subject matter of Example 88 optionally includes wherein change notification for the SCS includes a service identifier (ID), a flow ID, and a temporary mobile device ID to be used to identify a mobile termination (MT) for the first service flow of the UE.

In Example 90, the subject matter of any one or more of Examples 88-89 optionally include wherein the first event associated with the first service flow comprises a load balancing event or a user equipment mobility event; and wherein the processing circuitry is further arranged to: process a packet data unit (PDU) session establishment request from a first UE; initiate establishment of a first PDU session using a first gateway in response to the PDU session establishment request prior to receipt of the first service flow event trigger; and initiate establishment of a second PDU session for the first UE.

In Example 91, the subject matter of any one or more of Examples 88-90 optionally include wherein the processing circuitry comprises baseband circuitry of a server computer machine operating as the SNC.

Example 92 is an apparatus of a Service Capability Server (SCS) operating as an Application Server (AS) controller in communication with a long-term evolution (LTE) evolved packet core (EPC) network, the method comprising: a memory; and processing a service flow setup notification from a control plane device for a first service flow to a first user equipment (UE);
means for configuring the first service flow from a first application server to a first gateway in response to the service flow setup notification; means for processing a service flow change notification from the control plane device; and means for reconfiguring the first service flow to change the first application server to a second application server to configure the first service flow from the second application server to the first gateway in response to the service flow setup notification.

In Example 93, the subject matter of any one or more of Examples 91-92 optionally include wherein the service flow setup notification comprises user plane (UP) setup notification information for the first UE.

Example 94 is a method for operation of a Service Capability Server (SCS), the apparatus comprising: processing a service flow setup notification from a control plane device for a first service flow to a first user equipment (UE); configuring the first service flow from a first application server to a first gateway in response to the service flow setup notification; processing a service flow change notification from the control plane device; and reconfiguring the first service flow to change the first application server to a second application server to configure the first service flow from the second application server to the first gateway in response to the service flow setup notification.

Example 95 is a computer readable storage medium comprising instructions that, when executed by one or more processors, cause a machine to perform the operations of any method above.

In addition, alternate embodiments similar to the examples above may include any embodiment above with repeated or intervening operations.

Figure 8:
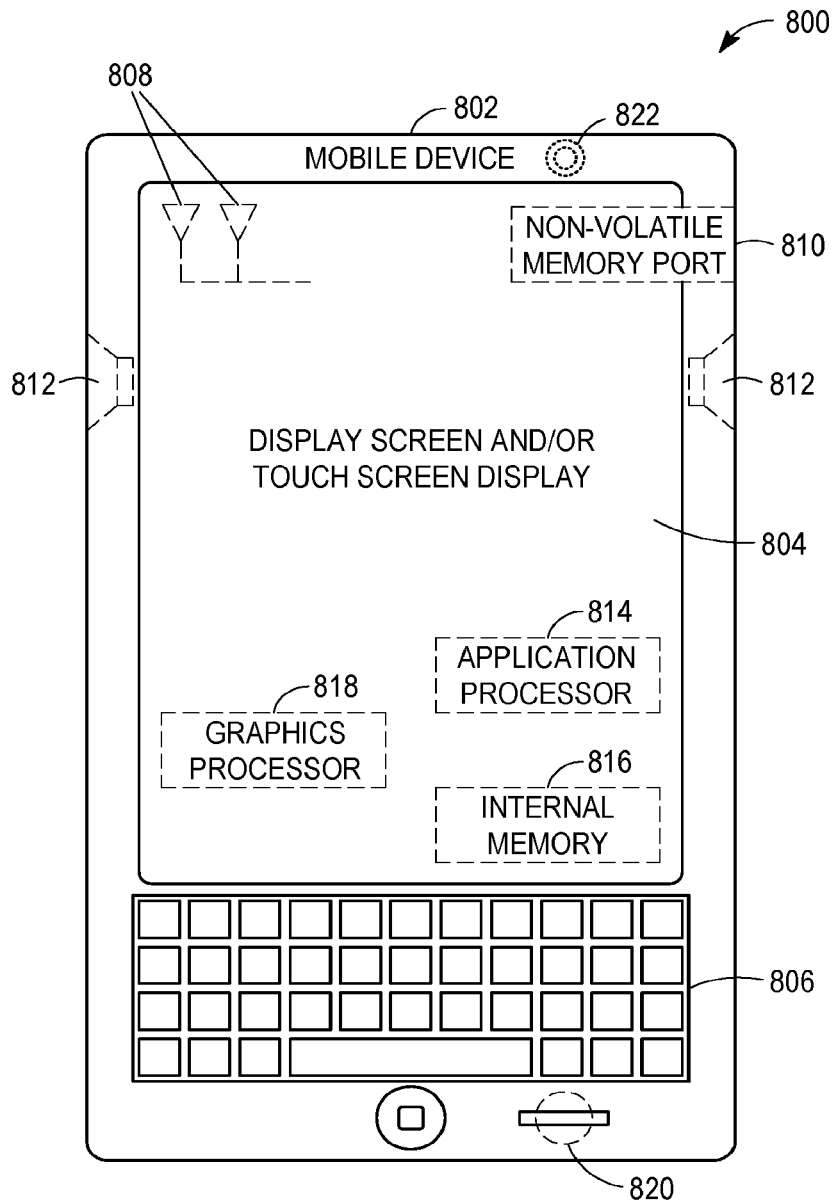
FIG. 8 illustrates aspects of a user equipment (UE), in accordance with some example embodiments.

FIG. 8 shows an example UE, illustrated as a UE 800. The UE 800 may be an implementation of the UE 101, or any device described herein. The UE 800 can include one or more antennas 808 configured to communicate with a transmission station, such as a base station (BS), an eNB, or another type of wireless wide area network (WWAN) access point. The UE 800 can be configured to communicate using at least one wireless communication standard including 3GPP LTE, WiMAX, High Speed Packet Access (HSPA), Bluetooth, and WiFi. The UE 800 can communicate using separate antennas for each wireless communication standard or shared antennas for multiple wireless communication standards. The UE 800 can communicate in a WLAN, a wireless personal area network (WPAN), and/or a WWAN.

FIG. 8 also shows a microphone 820 and one or more speakers 812 that can be used for audio input and output to and from the UE 800. A display screen 804 can be a liquid crystal display (LCD) screen, or another type of display screen such as an organic light emitting diode (OLED) display. The display screen 804 can be configured as a touch screen. The touch screen can use capacitive, resistive, or another type of touch screen technology. An application processor 814 and a graphics processor 818 can be coupled to an internal memory 816 to provide processing and display capabilities. A non-volatile memory port 810 can also be used to provide data I/O options to a user. The non-volatile memory port 810 can also be used to expand the memory capabilities of the UE 800. A keyboard 806 can be integrated with the UE 800 or wirelessly connected to the UE 800 to provide additional user input. A virtual keyboard can also be provided using the touch screen. A camera 822 located on the front (display screen) side or the rear side of the UE 800 can also be integrated into a housing 802 of the UE 800.

Figure 9:
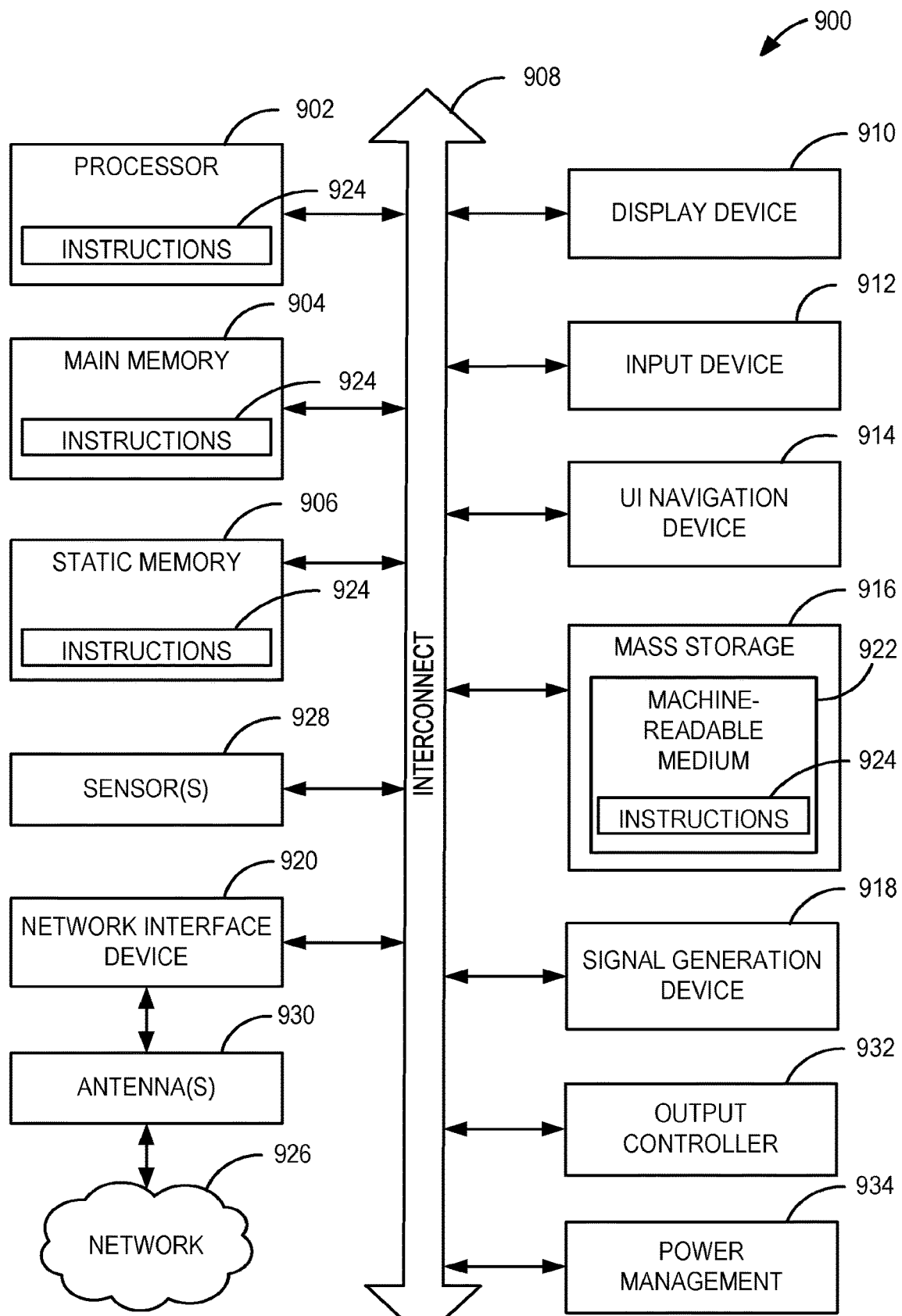
FIG. 9 is a block diagram illustrating an example computer system machine which may be used in association with various embodiments described herein.

FIG. 9 is a block diagram illustrating an example computer system machine 900 upon which any one or more of the methodologies herein discussed can be run, and which may be used to implement the SNC 104, the UE 101, or any other device described herein. In various alternative embodiments, the machine 900 operates as a standalone device or can be connected (e.g., networked) to other machines. In a networked deployment, the machine 900 can operate in the capacity of either a server or a client machine in server-client network environments, or it can act as a peer machine in peer-to-peer (or distributed) network environments. The machine 900 can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system machine 900 includes a processor 902 (e.g., a central processing unit (CPU), a graphics processing unit (GPU), or both), a main memory 904, and a static memory 906, which communicate with each other via an interconnect 908 (e.g., a link, a bus, etc.). The computer system machine 900 can further include a video display device 910, an alphanumeric input device 912 (e.g., a keyboard), and a user interface (UI) navigation device 914 (e.g., a mouse). In one embodiment, the video display device 910, alphanumeric input device 912, and UI navigation device 914 are a touch screen display. The computer system machine 900 can additionally include a mass storage device 916 (e.g., a drive unit), a signal generation device 918 (e.g., a speaker), an output controller 932, a power management controller 934, a network interface device 920 (which can include or operably communicate with one or more antennas 930, transceivers, or other wireless communications hardware), and one or more sensors 928, such as a GPS sensor, compass, location sensor, accelerometer, or other sensor.

The mass storage device 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904, static memory 906, and/or processor 902 during execution thereof by the computer system machine 900, with the main memory 904, the static memory 906, and the processor 902 also constituting machine-readable media.

While the machine-readable medium 922 is illustrated in an example embodiment to be a single medium, the term "machine-readable medium" can include a single medium or multiple media (e.g., a centralized or distributed database, and/or associated caches and servers) that store the one or more instructions 924. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions.

The instructions 924 can further be transmitted or received over a communications network 926 using a transmission medium via the network interface device 920 utilizing any one of a number of well-known transfer protocols (e.g., hypertext transfer protocol (HTTP)). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (i.e., instructions) embodied in tangible media, such as floppy diskettes, CD-ROMs, hard drives, non-transitory computer-readable storage media, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a Random Access Memory (RAM), Erasable Programmable Read-Only Memory (EPROM), flash drive, optical drive, magnetic hard drive, or other medium for storing electronic data. The eNB and UE may also include a transceiver module, a counter module, a processing module, and/or a clock module or timer module. One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, Institute of Electrical and Electronics Engineers (IEEE) 902.11, and Bluetooth communication standards. Various alternative embodiments may use a variety of other WWAN, WLAN, and WPAN protocols and standards in connection with the techniques described herein. These standards include, but are not limited to, other standards from 3GPP (e.g., HSPA+, UMTS), IEEE 902.16 (e.g., 902.16p), or Bluetooth (e.g., Bluetooth 8.0, or like standards defined by the Bluetooth Special Interest Group) standards families. Other applicable network configurations can be included within the scope of the presently described communication networks. It will be understood that communications on such communication networks can be facilitated using any number of personal area networks (PANs), local area networks (LANs), and wide area networks (WANs), using any combination of wired or wireless transmission mediums.

Figure 10:
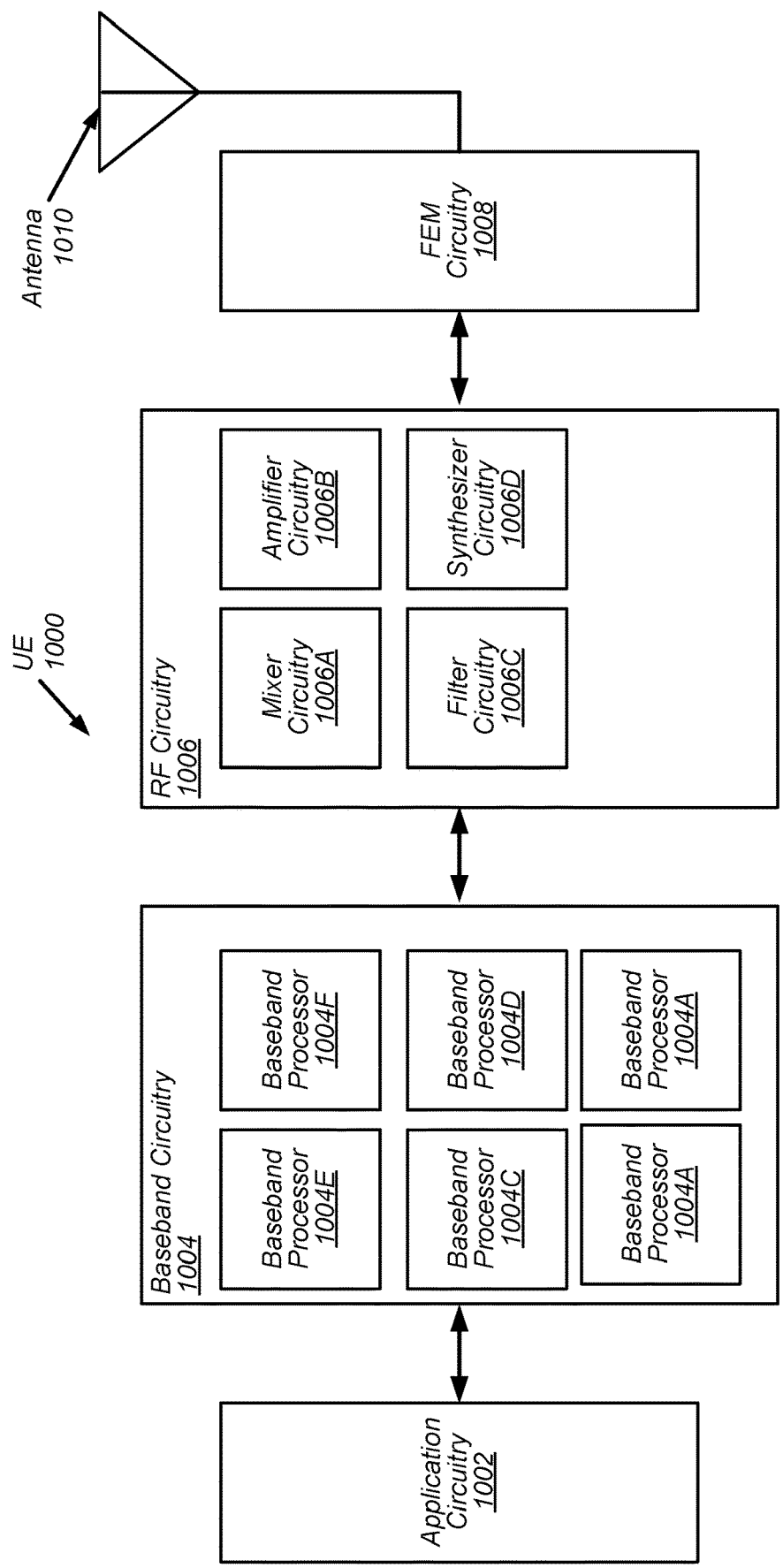
FIG. 10 illustrates aspects of a UE, in accordance with some example embodiments.

Embodiments described herein may be implemented in a system using any suitably configured hardware and/or software. FIG. 10 illustrates components of a UE 1000 in accordance with some embodiments. At least some of the components shown may be used in the UE 101 (or SNC 104) shown in FIG. 1. The UE 1000 and other components may be configured to use the synchronization signals as described herein. The UE 1000 may be one of the UEs 101 shown in FIG. 1 and may be a stationary, non-mobile device or may be a mobile device. In some embodiments, the UE 1000 may include application circuitry 1002, baseband circuitry 1004, Radio Frequency (RF) circuitry 1006, front-end module (FEM) circuitry 1008, and one or more antennas 1010, coupled together at least as shown. At least some of the baseband circuitry 1004, RF circuitry 1006, and FEM circuitry 1008 may form a transceiver. In some embodiments, other network elements, such as the eNBs of RAN 102, may contain some or all of the components shown in FIG. 10.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the UE 1000.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. The baseband circuitry 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004a, third generation (3G) baseband processor 1004b, fourth generation (4G) baseband processor 1004c, and/or other baseband processor(s) 1004d for other existing generations, generations in development, or generations to be developed in the future (e.g., fifth generation (5G), etc.). The baseband circuitry 1004 (e.g., one or more of the baseband processors 1004a-d) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include FFT, precoding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004e of the baseband circuitry 1004 may be configured to run elements of the protocol stack for signaling of the PHY, MAC, RLC, PDCP, and/or RRC layers. In some embodiments, the baseband circuitry 1004 may include one or more audio digital signal processor(s) (DSPs) 1004f. The audio DSP(s) 1004f may be or include elements for compression/decompression and echo cancellation and may include other suitable processing elements in other embodiments. Components of the baseband circuitry 1004 may be suitably combined in a single chip or a single chipset, or disposed on a same circuit board in some embodiments. In some embodiments, some or all of the constituent components of the baseband circuitry 1004 and the application circuitry 1002 may be implemented together, such as, for example, on a system on a chip (SOC).

In some embodiments, the baseband circuitry 1004 may provide for communication compatible with one or more radio technologies. For example, in some embodiments, the baseband circuitry 1004 may support communication with an EUTRAN and/or other wireless metropolitan area networks (WMAN), a WLAN, or a WPAN. Embodiments in which the baseband circuitry 1004 is configured to support radio communications of more than one wireless protocol may be referred to as multi-mode baseband circuitry. In some embodiments, the UE 1000 can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 80 GHz millimeter wave spectrum, or various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc., technologies either already developed or to be developed.

The RF circuitry 1006 may enable communication with wireless networks using modulated electromagnetic radiation through a non-solid medium. In various embodiments, the RF circuitry 1006 may include switches, filters, amplifiers, etc., to facilitate communication with the wireless network. The RF circuitry 1006 may include a receive signal path which may include circuitry to down-convert RF signals received from the FEM circuitry 1008 and provide baseband signals to the baseband circuitry 1004. The RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006a, amplifier circuitry 1006b, and filter circuitry 1006c. The transmit signal path of the RF circuitry 1006 may include the filter circuitry 1006c and the mixer circuitry 1006a. The RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by the synthesizer circuitry 1006d. The amplifier circuitry 1006b may be configured to amplify the down-converted signals, and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, the mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by the filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature downconversion and/or upconversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a of the transmit signal path may be arranged for direct downconversion and/or direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect, as other types of frequency synthesizers may be suitable. For example, the synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the application circuitry 1002 depending on the desired output frequency. In some embodiments, a divider control input (e.g., N) may be determined from a look-up table based on a channel indicated by the application circuitry 1002.

The synthesizer circuitry 1006d of the RF circuitry 1006 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1006 may include an IQ/polar converter.

The FEM circuitry 1008 may include a receive signal path, which may include circuitry configured to operate on RF signals received from the one or more antennas 1010, amplify the received signals, and provide the amplified versions of the received signals to the RF circuitry 1006 for further processing. The FEM circuitry 1008 may also include a transmit signal path, which may include circuitry configured to amplify signals for transmission provided by the RF circuitry 1006 for transmission by one or more of the one or more antennas 1010.

In some embodiments, the FEM circuitry 1008 may include a Tx/Rx switch to switch between transmit mode and receive mode operation. The FEM circuitry 1008 may include a receive signal path and a transmit signal path. The receive signal path of the FEM circuitry 1008 may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by the RF circuitry 1006), and one or more filters to generate RF signals for subsequent transmission (e.g., by one or more of the one or more antennas 1010).

In some embodiments, the UE 1000 may include additional elements such as, for example, a memory/storage, display, camera, sensor, and/or input/output (I/O) interface as described in more detail below. In some embodiments, the UE 1000 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly. In some embodiments, the UE 1000 may include one or more user interfaces designed to enable user interaction with the system and/or peripheral component interfaces designed to enable peripheral component interaction with the system. For example, the UE 1000 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 1010 may comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 1010 may be effectively separated to benefit from spatial diversity and the different channel characteristics that may result.

Although the UE 1000 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operations described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

While the communication device-readable medium is illustrated as a single medium, the term "communication device-readable medium" may include a single medium or multiple media (e.g., a centralized or distributed database, and/or associated caches and servers) configured to store the one or more instructions.

The term "communication device-readable medium" may include any medium that is capable of storing, encoding, or carrying instructions for execution by the communication device and that cause the communication device to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., EPROM, Electrically Erasable Programmable Read-Only Memory (EEPROM)) and flash memory devices; magnetic disks, such as internal hard disks and removable disks; magneto-optical disks; RAM; and CD-ROM and DVD-ROM disks. In some examples, communication device-readable media may include non-transitory communication device-readable media. In some examples, communication device-readable media may include communication device-readable media that is not a transitory propagating signal.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP), hypertext transfer protocol (HTTP), etc.). Example communication networks may include a LAN, a WAN, a packet data network (c.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, or peer-to-peer (P2P) networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using single-input multiple-output (SIMO), MIMO, or multiple-input single-output (MISO) techniques. In some examples, the network interface device may wirelessly communicate using Multiple User MIMO techniques. The term "transmission medium" shall be taken to include to any intangible medium that is capable of storing, encoding, or carrying instructions for execution by the communication device, and includes digital or analog communications signals or other intangible media to facilitate communication of such software.

In some systems, an eNB may have multiple antennas that may be used in various groupings and with various signal modifications for each grouping to produce a plurality of APs. Each AP may be defined for one or more antennas. Each AP may correspond to a different transmission signal direction. Using the different APs, the eNB may transmit multiple layers with codebook-based or non-codebook-based precoding techniques. Each AP may correspond to a beam that transmits AP-specific CSI-RS signals. The UE may contain a plurality of receive antennas that may be used selectively to create Rx beamforming. Rx beamforming may be used to increase the receive antenna (beamforming) gain for the direction(s) on which desired signals are received, and to suppress interference from neighboring cells. Fast Rx beam refinement, in which the Rx beam direction is dynamically adjusted in response to the channel conditions measured by the UE, is desirable from a performance standpoint.

This may be particularly desirable with use of the high-frequency bands around, for example, 28 GHz, 37 GHz, 39 GHz, and 84-71 GHz, used in conjunction with carrier aggregation, which may permit networks to continue to service the never-ending hunger for data delivery. The increased beamforming gain in this frequency range may permit the UE and eNB to compensate for the increasingly likely event of severe pathloss and suppress mutual user interference, leading to an increase in system capacity and coverage.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), RAM, magnetic disk storage media, optical storage media, flash-memory devices, and other storage devices and media. Some embodiments may include one or more processors and may be configured with instructions stored on a computer-readable storage device.

Although an embodiment has been described with reference to specific example embodiments, it will be evident that various modifications and changes may be made to these embodiments without departing from the broader scope of the present disclosure. Accordingly, the specification and drawings arc to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims arc entitled.

Such embodiments of the subject matter may be referred to herein, individually and/or collectively, by the term "embodiments" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, UE, article, composition, formulation, or process that includes elements in addition to those listed after such a term in a claim arc still deemed to fall within the scope of that claim. Moreover, in the following claims, the terms "first," "second," and "third," etc., are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method to be performed by a Software Defined Network (SDN) Network Controller (SNC) comprising:
   configuring a routing policy for one or more data gateways (DGWs), wherein the routing policy is to indicate a second DGW to take over service, from a first DGW, of a service flow of a user equipment (UE), wherein the first DGW and the second DGW are among the one or more DGWs;
   initiating a notification procedure including sending a request to perform the notification procedure to a services capability server (SCS) via a services interworking function (services-IWF);
   transmitting a Network Configuration Information Notification (NCIN) message to the SCS, wherein the NCIN message includes a service identifier (ID), flow ID, and temporary mobile device ID to be used to identify a mobile termination (MT) for the service flow of the UE;
   receiving, from the SCS or a first Application Server (AS) of a plurality of ASs, a request message indicating a service ID, the flow ID, the temporary mobile device ID, policy information type, and/or a response type;
   in response to a determination that the response type indicates there is a change, setting a notification flag associated with the service ID and the flow ID;
   determining new routing polices for the one or more DGWs based on a real-time network load status;
   updating a reconfiguration by updating routing policies to the new routing policies;
   determining whether the notification flag is set for the service flow and whether an associated boundary DGW has changed; and
   transmitting the NCIN message when the notification flag is set for the service flow and when the associated boundary DGW has changed.

2. The method of claim 1, wherein the transmitting the NCIN message comprises:
   transmitting a response message including the service ID, the temporary mobile device ID, and the policy information type to the services-IWF to provide policy information for a latest boundary DGW address to the SCS, wherein:
      the service ID, the flow ID, and the temporary mobile device ID are used to identify an MT service flow of the service;
      in response to a Routing Polices Update Response message, a Complete message is received from the services-IWF with an optional indicator indicating whether the notification flag should be kept active to set the notification flag as inactive;
      the service ID indicates an identity for a requested service, which is global unique or unique within an operator domain in a Public Land Mobile Network (PLMN);
      the flow ID indicates an identity of the service flow for the service which is allocated by the SNC when establishing the service flow of the service;
      the temporary mobile device ID is a temporary identity allocated by an operator domain which is unique within a serving PLMN;
      the policy information type indicates a type of policy information that is requested;
   the response type indicates a type of response that the SCS and/or AS requests including an instant response or response only when there are any changes to requested policy information; and
   the policy information indicates the latest boundary DGW address.

3. The method of claim 2, wherein the response message includes parameters to indicate a validity period of provided network configuration information, wherein a validity timer is to indicate an allowable time to apply a network configuration, and wherein the validity period is to indicate a scheduled time for MT packet transmission to request the UE to send MT packets via the provided network configuration information at the scheduled time.

4. The method of claim 1, wherein the NCIN comprises a user plane (UP) setup notification.

5. An apparatus, comprising:
   a processor configured to cause a control plane device to:
      configure a routing policy for one or more data gateways (DGWs), wherein the routing policy is to indicate a second DGW to take over service, from a first DGW, of a service flow of a user equipment (UE), wherein the first DGW and the second DGW are among the one or more DGWs;
      initiate a notification procedure including sending a request to perform the notification procedure to a services capability server (SCS) via a services interworking function (services-IWF);
      transmit a Network Configuration Information Notification (NCIN) message to the SCS, wherein the NCIN message includes a service identifier (ID), flow ID, and temporary mobile device ID to be used to identify a mobile termination (MT) for the service flow of the UE;
      receive, from the SCS or a first Application Server (AS) of a plurality of as a request message indicating a service ID, the flow ID, the temporary mobile device ID, policy information type, and/or a response type;
      in response to a determination that the response type indicates there is a change, set a notification flag associated with the service ID and the flow ID;
      determine new routing polices for the one or more DGWs based on a real-time network load status;
      update a reconfiguration by updating routing policies to the new routing policies;
      determine whether the notification flag is set for the service flow and whether an associated boundary DGW has changed; and
      transmit the NCIN message when the notification flag is set for the service flow and when the associated boundary DGW has changed.

6. The apparatus of claim 5, wherein the SCS is to determine, based on the NCIN message, to change a serving Application Server (AS) for the service flow to a second AS from a first AS, wherein the second AS is associated with the second DGW;

wherein the SCS is to retrieve service flow-related information from the second AS and transfer the service flow-related information to the first AS so as to continue the service of the service flow; and wherein the first AS is to start to transmit mobile-terminated packets via the first DGW.

7. The apparatus of claim 6, wherein the processor is further configured to cause the control plane device to:

detect a trigger event, wherein the initiation is based on the trigger event, and wherein the trigger event includes receiving one or more packets from the first DGW which originally served the service flow requested by the first AS, wherein the one or more packets are to be sent by the first DGW due to a failure;

analyze the one or more packets; and provide a latest boundary DGW address to the SCS in the NCIN message, wherein the service ID, flow ID, and temporary mobile device ID are useable to identify the MT for the service flow of the UE.

8. The apparatus of claim 7, wherein:

based on the latest boundary DGW address in the NCIN message, the SCS is to determine to change a serving AS from the first AS to the second AS;

the latest boundary DGW address is the second DGW;

the SCS is to retrieve service flow-related information from the first AS and transfer the service flow-related information to the second AS; and the second AS is to send an MT service request via the SCS to obtain latest information of the latest boundary DGW address before the latest boundary DGW address begins transmission of MT packets.

9. The apparatus of claim 5, wherein to transmit the NCIN message comprises:

transmitting a response message including the service ID, the temporary mobile device ID, and the policy information to type the services-IWF to provide policy information for a latest boundary DGW address to the SCS, wherein:

the service ID, the flow ID, and the temporary mobile device ID are used to identify an MT service flow of the service;

in response to a Routing Polices Update Response message, a Complete message is received from the services-IWF with an optional indicator indicating whether the notification flag should be kept active to set the notification flag as inactive;

the service ID indicates an identity for a requested service, which is global unique or unique within an operator domain in a Public Land Mobile Network (PLMN);

the flow ID indicates an identity of the service flow for the service which is allocated by the control plane device when establishing the service flow of the service;

the temporary mobile device ID is a temporary identity allocated by an operator domain which is unique within a serving PLMN;

the policy information type indicates a type of policy information that is requested;

the response type indicates a type of response that the SCS and/or AS requests including an instant response or response only when there are any changes to requested policy information; and the policy information indicates the latest boundary DGW address.

10. The apparatus of claim 9, wherein the response message includes parameters to indicate a validity period of provided network configuration information, wherein a validity timer is to indicate an allowable time to apply a network configuration, and wherein the validity period is to indicate a scheduled time for MT packet transmission to request the UE to send MT packets via the provided network configuration information at the scheduled time.

11. The apparatus of claim 5, wherein the NCIN comprises a user plane (UP) setup notification.

12. The apparatus of claim 5, wherein the control plane device comprises an entity of a long term evolution core.

13. The apparatus of claim 5, wherein the control plane device comprises an entity of a 5G core.

14. A control plane device, comprising:

an interface; and a processor operably coupled to the interface and configured to cause the control plane device to:

configure a routing policy for one or more data gateways (DGWs), wherein the routing policy is to indicate a second DGW to take over service, from a first DGW, of a service flow of a user equipment (UE), wherein the first DGW and the second DGW are among the one or more DGWs;

initiate a notification procedure including sending a request to perform the notification procedure to a services capability server (SCS) via a services interworking function (services-IWF);

transmit a Network Configuration Information Notification (NCIN) message to the SCS, wherein the NCIN message includes a service identifier (ID), flow ID, and temporary mobile device ID to be used to identify a mobile termination (MT) for the service flow of the UE;

receive, from the SCS or a first Application Server (AS) of a plurality of ASs, a request message indicating a service ID, the flow ID, the temporary mobile device ID, policy information type and/or a response type;

in response to a determination that the response type indicates there is a change, set a notification flag associated with the service ID and the flow ID;

determine new routing polices for the one or more DGWs based on a real-time network load status;

update a reconfiguration by updating routing policies to the new routing policies;

determine whether the notification flag is set for the service flow and whether an associated boundary DGW has changed; and transmit the NCIN message when the notification flag is set for the service flow and when the associated boundary DGW has changed.

15. The control plane device of claim 14, wherein the control plane device comprises an entity of a 5G core.

* * * * *